United States Patent
Pham Van et al.

(10) Patent No.: US 11,678,190 B2
(45) Date of Patent: Jun. 13, 2023

(54) METHOD FOR SECURE HANDLING OF EARLY DATA TRANSMISSION

(71) Applicant: TELEFONAKTIEBOLAGET LM ERICSSON (PUBL), Stockholm (SE)

(72) Inventors: Dung Pham Van, Upplands Väsby (SE); Magnus Stattin, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/048,569

(22) PCT Filed: Apr. 12, 2019

(86) PCT No.: PCT/IB2019/053042
§ 371 (c)(1),
(2) Date: Oct. 16, 2020

(87) PCT Pub. No.: WO2019/202451
PCT Pub. Date: Oct. 24, 2019

(65) Prior Publication Data
US 2021/0120420 A1    Apr. 22, 2021

Related U.S. Application Data

(60) Provisional application No. 62/658,560, filed on Apr. 16, 2018.

(51) Int. Cl.
*H04W 12/12* (2021.01)
*H04W 12/106* (2021.01)
(Continued)

(52) U.S. Cl.
CPC ....... *H04W 12/106* (2021.01); *H04W 12/122* (2021.01); *H04W 76/30* (2018.02)

(58) Field of Classification Search
CPC .............................. H04W 12/04; H04W 12/14
See application file for complete search history.

(56) References Cited

U.S. PATENT DOCUMENTS

2014/0281751 A1    9/2014    Gilda et al.
2019/0141515 A1*   5/2019    Kim ................... H04W 52/0229
2019/0223221 A1*   7/2019    Johansson ............. H04W 68/02

FOREIGN PATENT DOCUMENTS

CN        17804685 A    5/2006
CN        1802017 A     7/2006
(Continued)

OTHER PUBLICATIONS

Ericsson, Security for Msg3 in early data transmission, R2-1805176, 3GPP TSG-RAN WG2 #101bis, Sanya, P.R. of China, Apr. 16-20, 2018.

(Continued)

*Primary Examiner* — Michael T Vu

(57) ABSTRACT

According to certain embodiments, a method is performed by a network node for secure handling of early data transmission (EDT) during Random Access (RA) procedure before Radio Resource Control (RRC) setup is complete. The method includes receiving, from a wireless device, a RRC message comprising a resume connection request and data. Based on stored security information, the network node determines that the RRC message is suspicious. In response to determining that the RRC message is suspicious, the network node takes an action.

18 Claims, 17 Drawing Sheets

(51) Int. Cl.
   *H04W 76/30*       (2018.01)
   *H04W 12/122*      (2021.01)

(56) References Cited

FOREIGN PATENT DOCUMENTS

CN        101119381        2/2008
WO    2019064261   A1    4/2019

OTHER PUBLICATIONS

Interdigital Inc., Open Issues on Connection Control Procedures, R2-1802812 (Resubmission of R2-1801107), 3GPP RAN WG2 Meeting #101, Athens, Greece, Feb. 26-Mar. 2, 2018.
Wikipedia, Hash function, https://en.wikipedia.org/wiki/Hash_function, retrieved Jul. 28, 2019.
3rd Generation Partnership Project; Technical Specification Group Services and System Aspects; 3GPP System Architecture Evolution (SAE); Security architecture (Release 15), 3GPP TS 33.401 V15.1.0 (Sep. 2017).
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), 3GPP TS 36.300 V14.4.0 (Sep. 2017).
3rd Generation Partnership Project; Technical Specification Group Radio Access Network; Evolved Universal Terrestrial Radio Access (E-UTRA); Medium Access Control (MAC) protocol specification (Release 14), 3GPP TS 36.321 V14.4.0 (Sep. 2017).
3rd Generation Partnership Project; Technical Specification Group Radio Access Network; Evolved Universal Terrestrial Radio Access (E-UTRA); Radio Link Control (RLC) protocol specification (Release 14), 3GPP TS 36.322 V14.1.0 (Sep. 2017).
3rd Generation Partnership Project; Technical Specification Group Radio Access Network; Evolved Universal Terrestrial Radio Access (E-UTRA); Packet Data Convergence Protocol (PDCP) specification (Release 14), 3GPP TS 36.323 V14.4.0 (Sep. 2017).
3rd Generation Partnership Project; Technical Specification Group Radio Access Network; Evolved Universal Terrestrial Radio Access (E-UTRA); Radio Resource Control (RRC); Protocol specification (Release 14), 3GPP TS 36.3312 V14.4.0 (Sep. 2017).
Ericsson, "Context Relocation in NR Release 15," Tdoc R2-1713299, 3GPP TSG-RAN WG2 #100, Reno, Nevada, USA, Nov. 27-Dec. 1, 2017.
Huawei, Report of the Email discussion [101#57][NB-IoT/MTC R15] EDT remaining issues, R2-1805078, 3GPP TSG-RAN WG2 Meeting#101bis, Sanya, China, Apr. 16-20, 2018.
Huawei, et al., "Harmonization of RRC Connection Control management procedures," R2-1712579, 3GPP TSG-RAN WG2 #100, Reno, Nevada, USA, Nov. 27-Dec. 1, 2017.
Mediatek Inc., "Email outcome [99bis#54] EDT AS/NAS interaction," R2-1712076, 3GPP TSG-RAN WG2 #99bis, Prague, Czech Republic, Oct. 9-13, 2017.
Ericsson: "[E108-E116] Remaining FFSs in MO EDT", SGPP TSG-RAN W62 #103 R2-1812965. Gothenburg, Sweden, Aug. 20-24, 2018.
Ericsson: "Security for RRCResumeRequest message". 3GPP TSG-RAN WG2 #101, R2-1802373. Athens, Greece, 26th Feb.-Mar. 2, 2018.
Ericsson: "Way forward with Security in RRC Inactive". 3GPP TSG-RAN WG2 #101 Bis Tdoc R2-1805632. Sanya, P.R. of China, Apr. 16-20, 2018.
Huawei et al., "sPDCCH design", 3GPP TSG RAN WG1 Meeting #90, R1-1712076, Prague, Czech Republic, Aug. 21-25, 2017.
Huawei, et al.: "Security issues for EDT in the UP solution for eMTC and NB-IoT" 3GPP TSG-RAN WG2 Meeting #101. R2-1802218. Athens, Greece. Feb. 26-Mar. 2, 2018.

\* cited by examiner

METHOD FOR SECURE HANDLING OF EARLY DATA TRANSMISSION

This application is a 371 of International Application No. PCT/IB2019/053042, filed Apr. 12, 2019, which claims the benefit of U.S. Application No. 62/658,560, filed Apr. 16, 2018, the disclosures of which are fully incorporated herein by reference.

BACKGROUND

There has been a lot of work in 3GPP lately on specifying technologies to cover Machine-to-Machine (M2M) and/or Internet of Things (IoT)-related use cases. Most recent work for 3GPP Release 13 and 14 includes enhancements to support Machine-Type Communications (MTC) with new user equipment (UE) categories (Cat-M1, Cat-M2), supporting reduced bandwidth of up to 6 and 24 physical resource blocks (PRBs), and Narrowband IoT (NB-IoT) UEs providing a new radio interface (and UE categories Cat-NB1 and Cat-NB2).

As used herein, the term "eMTC" will be used to refer to the LTE enhancements introduced in 3GPP Release 13, 14, and 15 for machine-type communications (MTC), including (not limiting) support for bandwidth limited UEs, Cat-M1, and support for coverage enhancements. Though the term is not used herein to refer specifically to enhancements relating to NB-IoT (for any Release), it is generally recognized that the supported features are similar on a general level.

For both eMTC and NB-IoT, 'UP CIoT EPS optimization' and 'CP CIoT EPS optimization' signaling reductions were also introduced in Release 13. The former is a user-plane (UP) solution and allows the UE to resume a previously stored Radio Resource Control (RRC) connection (thus also known as RRC Suspend/Resume). The latter is a control-plane (CP) solution and allows for the transmission of user-plane data over Non-Access Stratum (NAS) (aka DoNAS).

For 3GPP Release 15, new work items (WIs) "Even further enhanced MTC for LTE (LTE_eMTC4)" (hereinafter, WI_eMTC) and "Further NB-IoT enhancements (NB_IOTenh2)" (hereinafter, WI_NBIOT) target eMTC and NB-IoT enhancements, respectively. In both of these WIs, a common goal is to reduce UE power consumption and latency by introducing possibilities to send data as early as possible during the Random Access (RA) procedure:

For example, WI_eMTC discloses:
Support early data transmission [RAN2 lead, RAN', RAN3]
Evaluate power consumption/latency gain and specify necessary support for downlink (DL)/uplink (UL) data transmission on a dedicated resource during the RA procedure (after Physical Random Access Channel (PRACH) transmission and before the RRC connection setup is completed) at least in the RRC Suspend/Resume case.
As another example, WI_NBIOT discloses:
Evaluate power consumption/latency gain and specify necessary support for DL/UL data transmission on a dedicated resource during the RA procedure after Narrowband-PRACH (NPRACH) transmission and before the RRC connection setup is completed. [RAN2, RAN1, RAN3]

In recent RAN2 meetings, i.e., RAN2 #99, RAN2 #99bis, RAN2 #100, and RAN2 #101, many contributions on early data transmissions (EDTs) were discussed. Agreements supporting early UL data transmission in Msg3 for the Release 13 UP solution are summarized as follows:

Early UL data transmission is supported in Msg3 for CP and UP CIoT EPS optimisation.
For the UP solution, SRB0 is used to transmit the RRC message in Msg3.
For the UP solution, common control channel (CCCH) (RRC message) and dedicated traffic channel (DTCH) (UP data) are multiplexed in MAC in Msg3.
For the UP solution, AS security is resumed before transmitting Msg3, and data transmitted in Msg3 is protected by AS security.
FFS how to address the padding issue in Msg3.
ResumeID, shortResumeMAC-I, and resumeCause are included in Msg3 for Early Data Transmission (EDT).
None of the parameters currently provided in MSG5 are included in Msg3 for EDT.
UE is in RRC_IDLE when transmitting Msg3 for EDT, same as legacy.
UE shall perform access barring check before initiating EDT.
UE shall restore the UE context, reactivate security, and re-establish/resume all SRBs/DRBs. The UE shall derive new keys based on the next hop chaining counter (NCC) provided in the previous connection. It is FFS in which message NCC is provided in the previous connection. The FFS is pending SA3 feedback.
Legacy RRCConnectionResumeRequest message is used in Msg3.

Regarding the FFS about the provision of NCC and other security aspects, RAN2 has asked SA3 and received their input as below:

Reply LS on Early Data Transmission (S3-173472):
2) Is there any security issue on providing NCC to UE during the previous connection for the purpose of using this for UL data transmission in Msg3 for user plane CIoT EPS optimisation?
SA3' answer: No security issues are identified. It is SA WG3's understanding that the said NCC would be sent in the last RRC Connection Suspend/Release message used for suspension of the previous connection.
3) Is there any security issue on providing NCC to UE during the previous connection for the purpose of using this for DL data transmission in Msg4 for user plane CIoT EPS optimisation?
SA3' answer: No security issues are identified.
4) RAN2 assumes that there are no security related concerns in transmitting UL data in Msg3 for user plane CIoT EPS optimisation. Please confirm this assumption.
SA3' answer: If UL data from the UE to the eNB is further sent to a serving gateway (S-GW) before Msg5 is received, the UE is essentially authenticated with only 16-bit shortResumeMAC-I. There is a slight risk that an attacker is able to guess the 16-bit shortResumeMAC-I, construct fake Msg3, and be able to inject data even before the real UE would send Msg3. It is not clear how big risk this would be in practice, but in general, SA3 recommends using 32-bit shortResumeMAC-I, if that is possible. This recommendation is based on SA3's understanding that the current space restrictions in Msg3 would allow using a 32-bit shortResumeMAC-I. If PDCP security could be used already for Msg3 that would be fine as well from SA3's perspective.

In addition, after RAN2 #101, there has been discussion relating to the security issues for EDT, i.e., R2-5804899.

FIG. 1 illustrates the contention-based RA procedure from TS 36.900, "E-UTRA and E-UTRAN; Overall description; Stage 2", v14.4.0, September 8017. As used herein, the messages in the RA procedure may be referred to as message 1 (Msg1) through message 4 (Msg4).

In legacy LTE, Msg3 is an early message and with neither confidentially nor integrity protection. In the 13 UP solution, Msg3 includes the RRCConnectionResumeRequest, which may also be referred to as the short ResumeRequest. For Release 14 and earlier releases, the ResumeRequest is formed at RRC layer with a security token such as, for example, a shortResumeMAC-I (sRMAC-I), that is used to validate the authenticity of the ResumeRequest. The sRMAC-I is calculated and verified at the RRC layer based on a set of variables including the target Cell ID, the source physical Cell ID, and the C-RNTI used in the source cell. As specified in 3GPP TS 36.331, "RRC protocol specification"; v14.4.0, September 8017, the UE variable VarShortResume-MAC-Input specifies the input used to generate the shortResumeMAC-I during RRC Connection Resume procedure:

| VarShortResumeMAC-Input UE variable |
| --- |
| -- ASN1START<br>VarShortResumeMAC-Input-r13 ::=　　　SEQUENCE {<br>　　cellIdentity-r13　　　　　　　　CellIdentity,<br>　　physCellId-r13　　　　　　　　PhysCellId,<br>　　c-RNTI-r13　　　　　　　　　C-RNTI,<br>　　resumeDiscriminator-r13　　　　　BIT STRING(SIZE(1))<br>}<br>-- ASN1STOP |

| VarShortResumeMAC-Input field descriptions |
| --- |
| cellIdentity |
| Set to CellIdentity of the current cell. |
| c-RNTI |
| Set to C-RNTI that the UE had in the PCell it was connected to prior to suspension of the RRC connection. |
| physCellId |
| Set to the physical cell identity of the PCell the UE was connected to prior to suspension of the RRC connection. |
| resumeDiscriminator |
| A constant that allows differentiation in the calculation of the MAC-I for shortResumeMAC-I<br>The resumeDiscriminator is set to '1' |

In the Release 13 UP solution, user data is transmitted after the RRC connection resume completion with AS security. More specifically, the earliest time UL data can be transmitted is in Msg5. Specifically, the UL data may be multiplexed with the RRCConnectionResumeComplete. The transmission of Msg5 is considered from a legitimate UE if the eNB successfully verifies RRCConnectionResumeComplete message in Msg5 based on a 32-bit message authentication code for integrity protection (MAC-I), which is calculated and checked at the PDCP sub-layer. In case of successful verification, the UL data received in Msg5 is forwarded from the eNB to the serving gateway (S-GW).

There currently exist certain challenge(s). For example, when it comes to EDT in Msg3 where UL data is multiplexed with the ResumeRequest at MAC sub-layer, the UL data transmission is on the DTCH logical channel over data radio bearer (DRB) and, thus, is ciphered at the PDCP sub-layer. However, while the current way of calculating the sRMAC-I allows the eNodeB to know if it was produced by a legitimate UE, the current approach does not allow the eNodeB to know if it was sent by a legitimate UE or not. Thus, an attacker may copy the resume request and pretend to be a legitimate UE. This scenario may be referred to as a replay attack. The eNodeB is unable to detect such a replayed Msg3 by verifying the sRMAC-I.

Since in EDT, the UE can be indicated to be in Idle mode after Msg4, the eNodeB may allocate a new resumeID for the UE context and send to the attacker in Msg4 in response to a replayed Msg3. When the legitimate UE tries random access again, the legitimate UE's context no longer exists since the legitimate UE's resumeID is obsolete. Meanwhile, the UL data received in the replayed Msg3 would be forwarded to the S-GW.

The level of risk from replay attacks depends on whether the UE attempts to resume right after a reject or not. In the former case, if a legitimate UE was just rejected with a suspend indication and tries to resume again to the same cell, the legitimate UE's Msg3 is exactly the same as the one which was rejected. Thus, it is not possible for the eNodeB to distinguish this legitimate Msg3 from a replayed one.

SUMMARY

Certain aspects of the present disclosure and their embodiments may provide solutions to these or other challenges. For example, a solution is proposed to enhance security for transmission of Message 3 (Msg3) with user data to allow legitimate wireless devices to continue with resumption rather than being requested to establish a new connection, and at the same time, to mitigate, reduce, and/or prevent replay attacks. The disclosed solution is particularly advantageous when the UE has continuous attempts to resume to the same cell, for example, after a reject with a suspend indication.

According to certain embodiments, a method is performed by a network node for secure handling of early data transmission (EDT) during Random Access (RA) procedure before Radio Resource Control (RRC) setup is complete. The method includes receiving, from a wireless device, a RRC message comprising a resume connection request and data. Based on stored security information, the network node determines that the RRC message is suspicious. In response to determining that the RRC message is suspicious, the network node takes an action.

According to certain embodiments, a network node is provided for secure handling of EDT during RA procedure before RRC setup is complete. The network node includes memory storing instructions and processing circuitry configured to execute the instructions to cause the network node to receive, from a wireless device, a RRC message comprising a resume connection request and data. Based on stored security information, the network node determines that the RRC message is suspicious. In response to determining that the RRC message is suspicious, the network node takes an action.

According to certain embodiments, a method is performed by a network node that is a source network node associated with a first handover of a wireless device from the source network node to a first target network node. The method includes transmitting a first context associated with the wireless device to the first target network node during the handover of the wireless device to the first target network node. Information related to the first context is received from the first target network node. The network node takes an action based on the information related to the first context associated with the wireless device.

According to certain embodiments, a network node that is a source network node associated with a first handover of a wireless device from the source network node to a first target network node includes memory storing instructions and processing circuitry. The processing circuitry is configured to execute the instructions to cause the network node to transmit a first context associated with the wireless device to the first target network node during the handover of the wireless device to the first target network node. Information related to the first context is received from the first target network node. The network node takes an action based on the information related to the first context associated with the wireless device.

Certain embodiments may provide one or more of the following technical advantage(s). For example, a technical advantage may be that certain embodiments provide appropriate level of protection for uplink (UL) data in Msg3 when adopting the EDT concept. As another example, a technical advantage may be that certain embodiments avoid unnecessary complete connection release without being certain that the received Msg3 is replayed. This allows legitimate UEs to reattempt resume and send user data in Msg3, while enabling the eNB to forward UL data received in Msg3 to serving gateway (S-GW) in a secure manner. Still another technical advantage may be that the disclosed techniques are applicable to LTE and NB-IoT and can also be applied to other systems and/or technologies such as for example 5G/NR.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
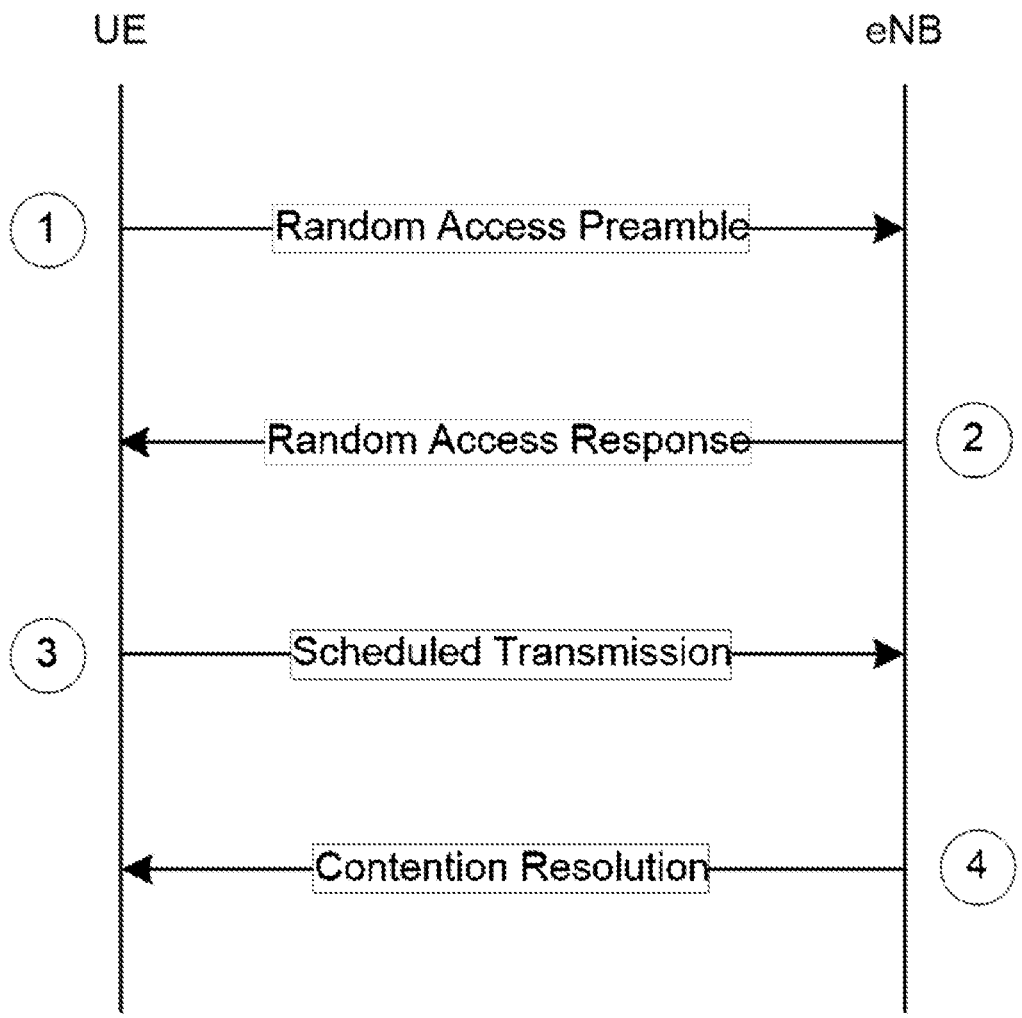
FIG. 1 illustrates the contention-based Random Access (RA) procedure from TS36.900

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

According to certain embodiments, the behavior of an eNodeB (eNB) is specified for when the eNB receives a suspicious Early Data Transmission (EDT) Msg3 whose short resume message authentication code-identifier (sR-MAC-I) has been seen earlier. Such a Msg3 may be either a replayed message or such a message may be from a legitimate user equipment (UE). In case of the former, a complete release (i.e., without a suspend indication) makes Access Stratum (AS) context of the legitimate UE obsolete. In case of the latter, a complete release makes the legitimate UE unable to perform normal resumption as it should be, while user data in Msg3 is not treated as it should be. Thus, in both cases, the eNB should not unnecessarily completely release the connection. Instead, the eNB may decide to forward user data to a serving gateway (S-GW) and release the connection with suspend when it is certain that the received Msg3 is from the legitimate UE and/or there is/are no sign(s) and/or indications that the received Msg3 is a replay. Otherwise, the eNB holds back, stores user data, indicates the UE to go to RRC_CONNECTED mode in order to further check the legitimateness by means of the complete MAC-I in Msg5.

According to certain embodiments, the network may keep track of resume requests, for example, by storing a list of sRMAC-Is and/or other information, possibly comprising/ including the whole Msg3, that will serve as input to make decision once receiving a suspicious Msg3. The length of such a list can be determined based on some mechanism/ parameters, which are outside the scope of this disclosure.

According to a particular embodiment, for example, the most straightforward way is that the network, once it receives a suspicious Msg3 such as, for example, one with an sRMAC-I that has been seen before, rejects the UE without a suspend indication. This applies also for the case the network could not retrieve UE context when the UE comes back. With the complete release, the UE needs to start over from scratch to establish a connection again.

According to another particular embodiment, after receiving a release with suspend indication in response to a EDT Msg3 with user data, the EDT-capable UE may continue EDT in Msg3 in subsequent attempts. In another embodiment, if the network responds to a EDT Msg3 with a complete release without suspend indication, the UE should not try EDT until it is provided with next hop chaining counter (NCC) in suspend procedure.

According to certain embodiments, the network may define a threshold for the number of continuous resume attempts from a UE. For example, when the UE reaches this threshold, the network may completely release the connection.

Figure 2:
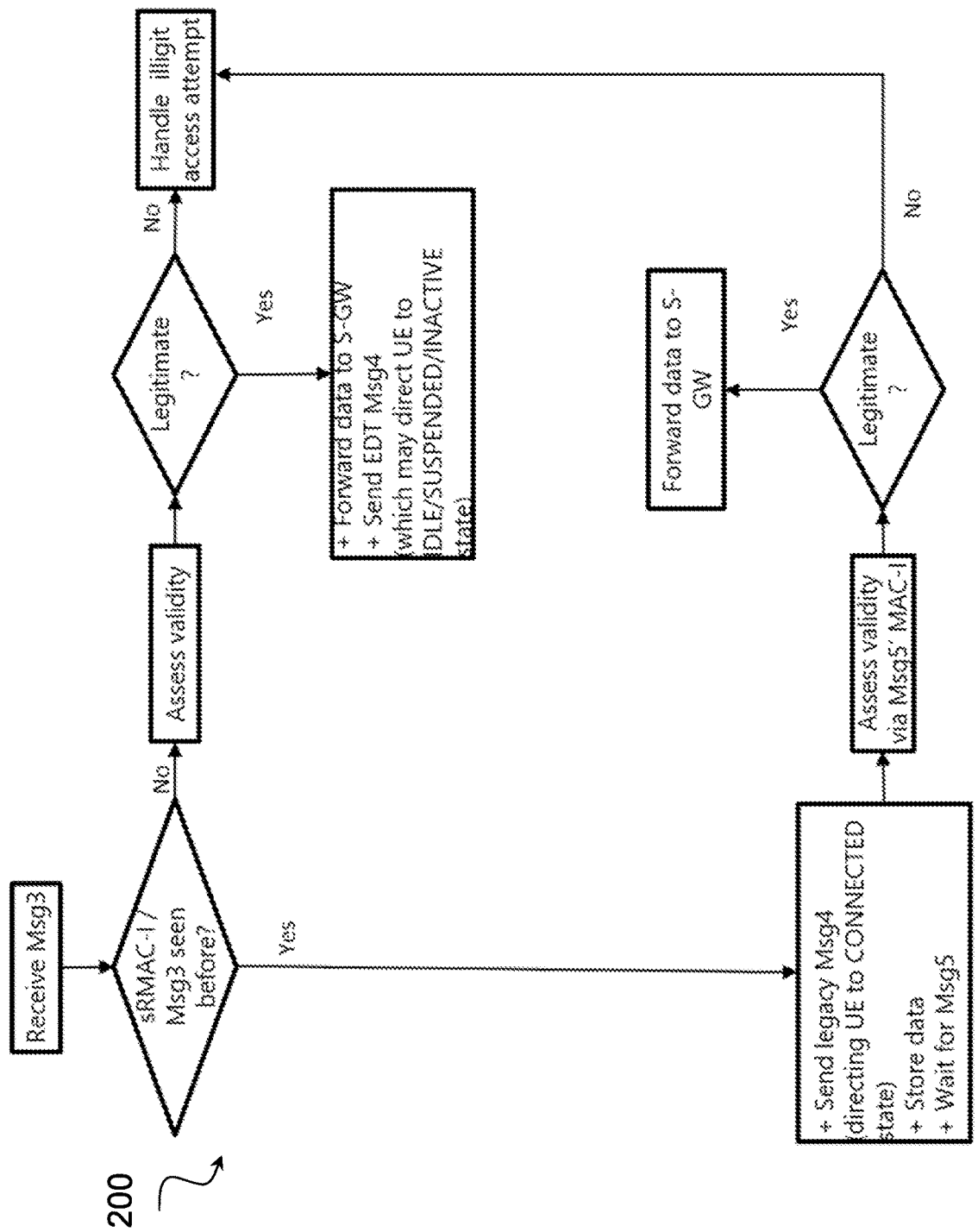
FIG. 2 illustrates an example flow diagram for Msg3 handling, according to certain embodiments.
Figure 3:
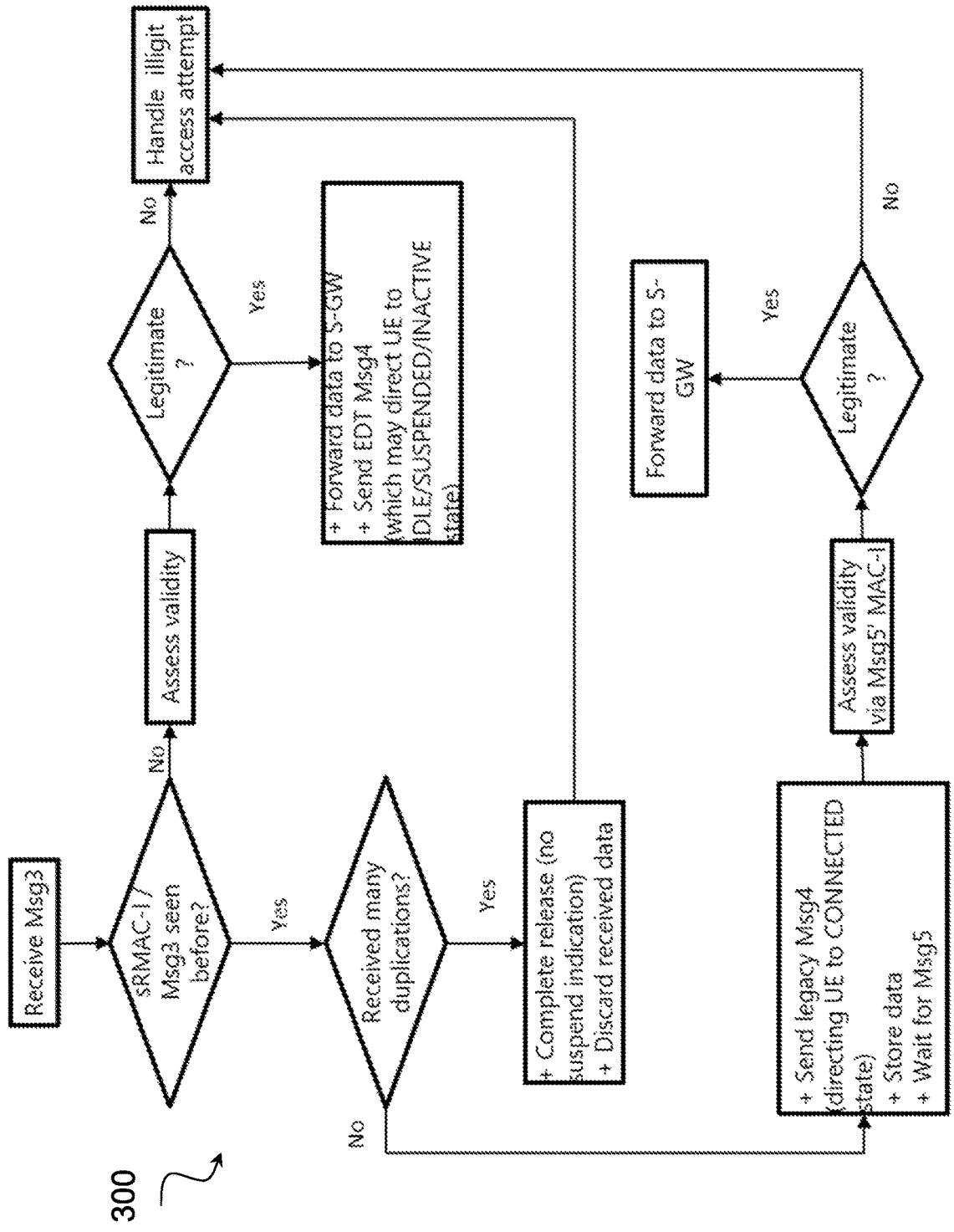
FIG. 3 illustrates an example flow diagram for Msg3 handling with a duplication check, according to certain embodiments.

According to certain other embodiments (as illustrated in FIGS. 2 and 3, which are described in more detail below), once the network receives a EDT Msg3 (i.e., with user data) whose sRMAC-I has been seen before:

The network indicates the UE to enter RRC_CONNECTED mode and stores received user data until it receives Msg5. The data is only forwarded to the S-GW if the packet data convergence protocol (PDCP) verifies the MAC-I in Msg5 successfully. The legitimate UE in this case could not go back to RRC_IDLE mode immediately after Msg4, as a EDT-capable UE may prefer, but the RRC connection and the UE context do not need to be released/discarded, e.g., by rejection without suspend indication or by fallback to connection establishment, i.e., requiring to establish the connection from scratch is avoided. By delaying forwarding of the data to after reception and verification of MAC-I inMsg5, detection of replay by an illegitimate entity is enabled since the attacker does not have AS keys to form a correct/valid Msg5. If the MAC-I in Msg5 is not valid/does not verify, i.e. potential replay, the received data in Msg3 is considered bad data and discarded. FIG. 2 illustrates an example flow diagram 200 for such Msg3 handling, according to certain embodiments.

If many duplications of such Msg3 have been received, the network can optionally consider this situation as replay attacks. The network may completely release the connection and discard possible received data in Msg3. This helps discourage replay attackers to try multiple attempts for a Msg3 and legitimate UEs could get back to access after establishing a connection. FIG. 3 illustrates an example flow diagram 300 for Msg3 handling with such a duplication check, according to certain embodiments.

In another embodiment, to enable the network to detect replay attack in Msg3 as well as to distinguish a replayed Msg3 with a subsequent Msg3 from a legitimate UE:

The UE includes a freshness parameter in the calculation of sRMAC-I so that different attempts are associated with different sRMAC-I.

The parameter can be a temporary C-RNTI and/or frame number (e.g., radio frame number, system frame number, connection frame number or session frame number). The combination of different parameters helps strengthen the freshness with a larger range/scope, i.e., the attacker has a lower probability to succeed in guessing the freshness parameter.

In case the UE uses either only temp C-RNTI or only frame number as the freshness parameter, when the network is about running out of the unused values of temp C-RNTI/frame number, the network releases the UE context by enforcing a reject without suspend indication.

In another embodiment, in case of EDT, if the UE does include only user data (in any form) but no freshness parameter in calculation of sRMAC-I, once the network receives a suspicious Msg3, it may not forward the received data until the successful verification of MAC-I in Msg5. This is because including data in sRMAC-I calculation helps provide integrity protection of data in Msg3 itself. The attacker may replay the whole Msg3 and once the network receives this Msg3, if it replies with a release message with suspend indication, the context of legitimate UE will be obsolete.

Figure 4:
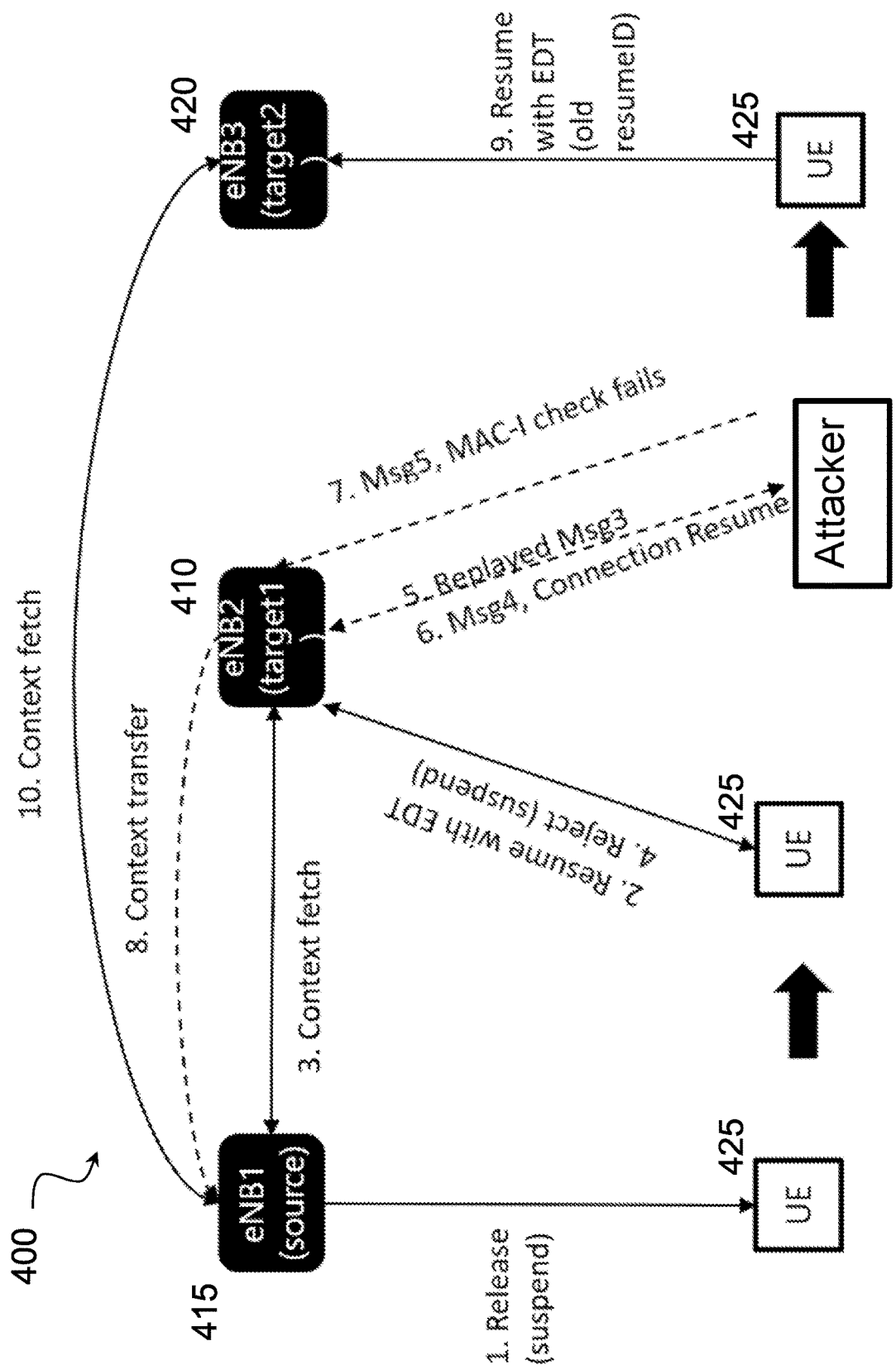
FIG. 4 illustrates a flow diagram for handling UE context after a reject, according to certain embodiments.

FIG. 4 illustrates a flow diagram 400 for handling UE context after a reject, according to certain embodiments. For example, in a particular embodiment, in case the target node 410 receives a suspicious EDT Msg3, the source node 415 may not remove/delete the UE context until the full PDCP MAC-I in Msg5 is verified at the target node 420. Alternatively, target node 420 shall send the UE context back to the source node at step 8, making it available for a subsequent resume attempt. This is to avoid the situation that no UE context is available, when target node 420 needs to fetch the context for a subsequent connection resume. As depicted in steps 2 to 5 in FIG. 4, when the replay attack occurs after a reject, source node eNB1 415 might delete the context after eNB2 410 fetches context in step 3. Thus, without a context return in step 8, when the UE 425 resumes to another node such as, for example, eNB3 420, context fetch in step 10 would not possible.

Figure 5:
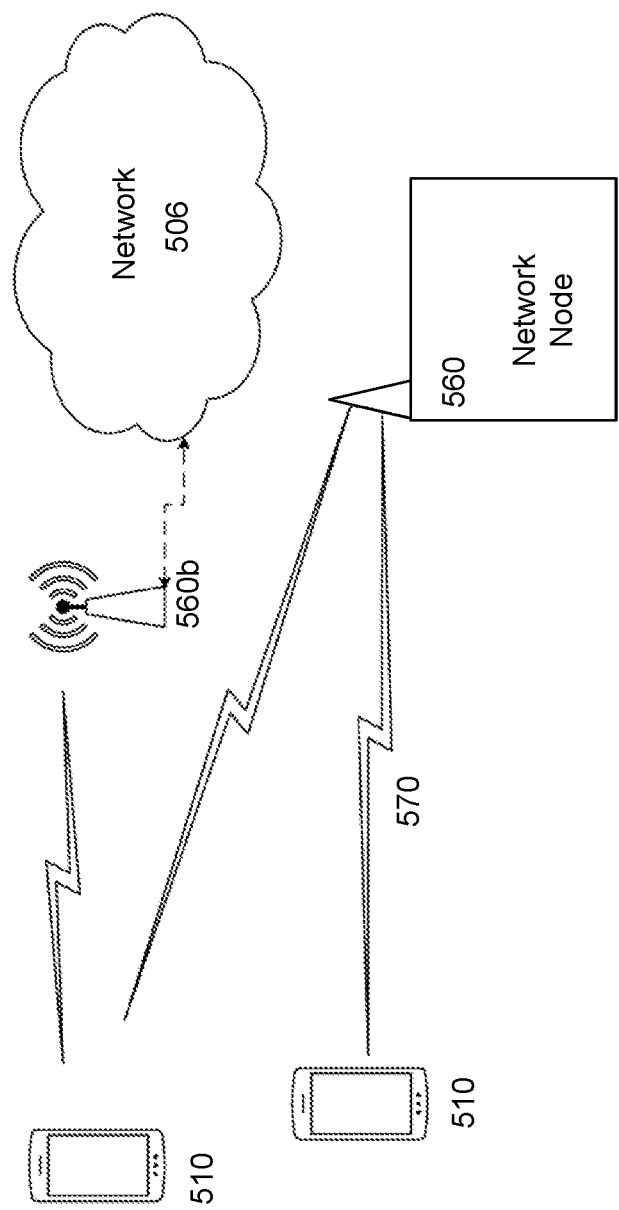
FIG. 5 illustrates an example wireless network for secure handling of Early Data Transmission (EDT) during a RA procedure, according to certain embodiments.

Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 506, network nodes 560 and 560b, and WDs 510, 510b, and 510c. In practice, a wireless network may further include any additional elements suitable to support communication between wireless devices or between a wireless device and another communication device, such as a landline telephone, a service provider, or any other network node or end device. Of the illustrated components, network node 560 and wireless device (WD) 510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 560 and WD 510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 6:
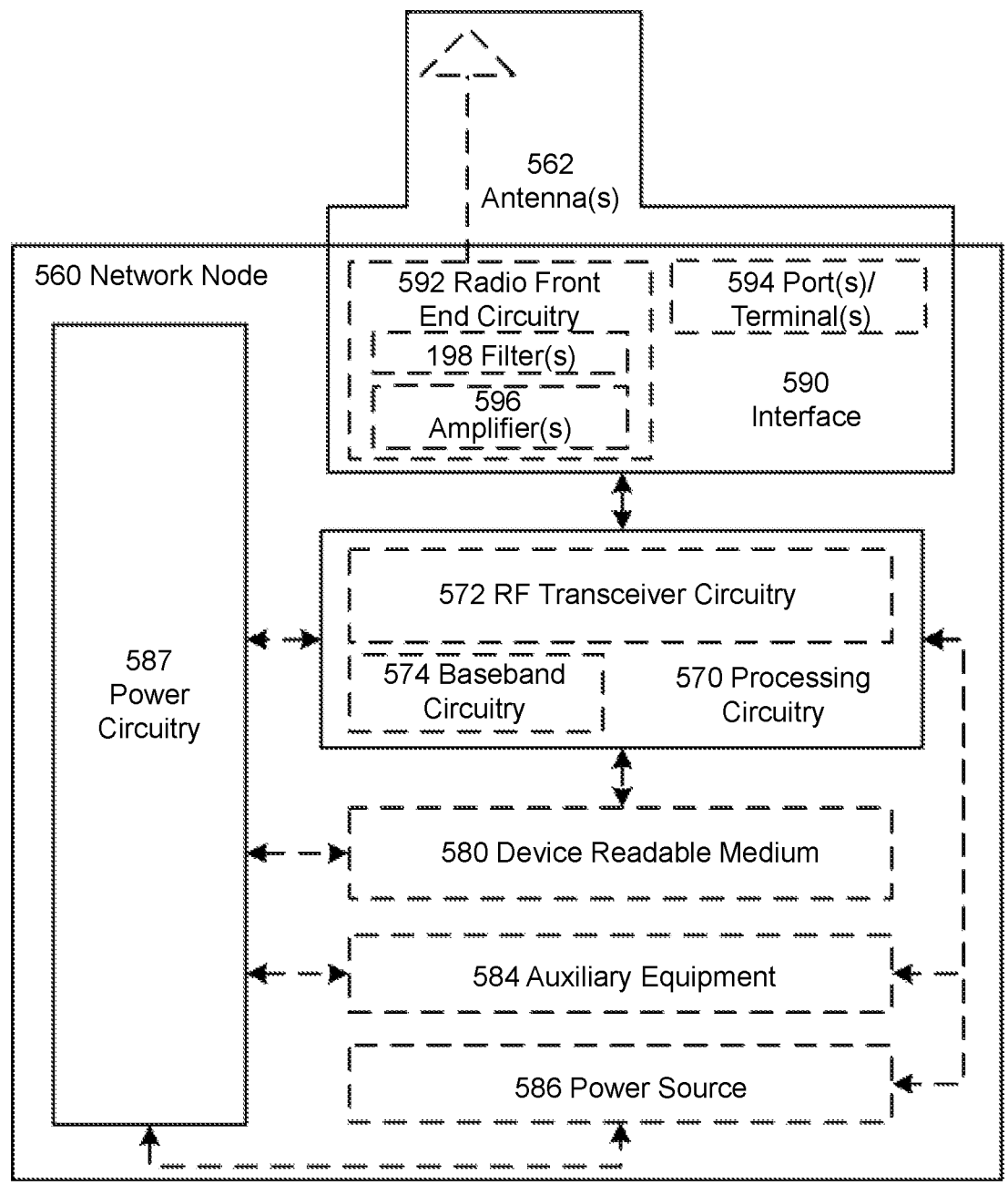
FIG. 6 illustrates an example network node for secure handling of EDT during a RA procedure, according to certain embodiments.

FIG. 6 illustrates an example network node 560, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 560 includes processing circuitry 570, device readable medium 580, interface 590, auxiliary equipment 584, power source 586, power circuitry 587, and antenna 562. Although network node 560 illustrated in the example wireless network of FIG. 5 and FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 560 are depicted as single boxes located within a larger box, or nested within multiple boxes, in practice, a network node may comprise multiple different physical components that make up a single illustrated component (e.g., device readable medium 580 may comprise multiple separate hard drives as well as multiple RAM modules).

Similarly, network node 560 may be composed of multiple physically separate components (e.g., a NodeB component and a RNC component, or a BTS component and a BSC component, etc.), which may each have their own respective components. In certain scenarios in which network node 560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 560 may be configured to support multiple radio access technologies (RATs). In such embodiments, some components may be duplicated (e.g., separate device readable medium 580 for the different RATs) and some components may be reused (e.g., the same antenna 562 may be shared by the RATs). Network node 560 may also include multiple sets of the various illustrated components for different wireless technologies integrated into network node 560, such as, for example, GSM, WCDMA, LTE, NR, WiFi, or Bluetooth wireless technologies. These wireless technologies may be integrated into the same or different chip or set of chips and other components within network node 560.

Processing circuitry 570 is configured to perform any determining, calculating, or similar operations (e.g., certain obtaining operations) described herein as being provided by a network node. These operations performed by processing circuitry 570 may include processing information obtained by processing circuitry 570 by, for example, converting the obtained information into other information, comparing the obtained information or converted information to information stored in the network node, and/or performing one or more operations based on the obtained information or converted information, and as a result of said processing making a determination.

Processing circuitry 570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 560 components, such as device readable medium 580, network node 560 functionality. For example, processing circuitry 570 may execute instructions stored in device readable medium 580 or in memory within processing circuitry 570. Such functionality may include providing any of the various wireless features, functions, or benefits discussed herein. In some embodiments, processing circuitry 570 may include a system on a chip (SOC).

In some embodiments, processing circuitry 570 may include one or more of radio frequency (RF) transceiver circuitry 572 and baseband processing circuitry 574. In some embodiments, radio frequency (RF) transceiver circuitry 572 and baseband processing circuitry 574 may be on separate chips (or sets of chips), boards, or units, such as radio units and digital units. In alternative embodiments, part or all of RF transceiver circuitry 572 and baseband processing circuitry 574 may be on the same chip or set of chips, boards, or units In certain embodiments, some or all of the functionality described herein as being provided by a network node, base station, eNB or other such network device may be performed by processing circuitry 570 executing instructions stored on device readable medium 580 or memory within processing circuitry 570. In alternative embodiments, some or all of the functionality may be provided by processing circuitry 570 without executing instructions stored on a separate or discrete device readable medium, such as in a hard-wired manner. In any of those embodiments, whether executing instructions stored on a device readable storage medium or not, processing circuitry 570 can be configured to perform the described functionality. The benefits provided by such functionality are not limited to processing circuitry 570 alone or to other components of network node 560, but are enjoyed by network node 560 as a whole, and/or by end users and the wireless network generally.

Device readable medium 580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 570. Device readable medium 580 may store any suitable instructions, data or information, including a computer program, software, an application including one or more of logic, rules, code, tables, etc. and/or other instructions capable of being executed by processing circuitry 570 and, utilized by network node 560. Device readable medium 580 may be used to store any calculations made by processing circuitry 570 and/or any data received via interface 590. In some embodiments, processing circuitry 570 and device readable medium 580 may be considered to be integrated.

Interface 590 is used in the wired or wireless communication of signalling and/or data between network node 560, network 506, and/or WDs 510. As illustrated, interface 590 comprises port(s)/terminal(s) 594 to send and receive data, for example to and from network 506 over a wired connection. Interface 590 also includes radio front end circuitry 592 that may be coupled to, or in certain embodiments a part of, antenna 562. Radio front end circuitry 592 comprises filters 598 and amplifiers 596. Radio front end circuitry 592 may be connected to antenna 562 and processing circuitry 570. Radio front end circuitry may be configured to condition signals communicated between antenna 562 and processing circuitry 570. Radio front end circuitry 592 may receive digital data that is to be sent out to other network nodes or WDs via a wireless connection. Radio front end circuitry 592 may convert the digital data into a radio signal having the appropriate channel and bandwidth parameters using a combination of filters 598 and/or amplifiers 596. The radio signal may then be transmitted via antenna 562. Similarly, when receiving data, antenna 562 may collect radio signals which are then converted into digital data by radio front end circuitry 592. The digital data may be passed to processing circuitry 570. In other embodiments, the interface may comprise different components and/or different combinations of components.

In certain alternative embodiments, network node 560 may not include separate radio front end circuitry 592, instead, processing circuitry 570 may comprise radio front end circuitry and may be connected to antenna 562 without separate radio front end circuitry 592. Similarly, in some embodiments, all or some of RF transceiver circuitry 572 may be considered a part of interface 590. In still other embodiments, interface 590 may include one or more ports or terminals 594, radio front end circuitry 592, and RF transceiver circuitry 572, as part of a radio unit (not shown), and interface 590 may communicate with baseband processing circuitry 574, which is part of a digital unit (not shown).

Antenna 562 may include one or more antennas, or antenna arrays, configured to send and/or receive wireless signals. Antenna 562 may be coupled to radio front end circuitry 590 and may be any type of antenna capable of transmitting and receiving data and/or signals wirelessly. In some embodiments, antenna 562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 562 may be separate from network node 560 and may be connectable to network node 560 through an interface or port.

Antenna 562, interface 590, and/or processing circuitry 570 may be configured to perform any receiving operations and/or certain obtaining operations described herein as being performed by a network node. Any information, data and/or signals may be received from a wireless device, another network node and/or any other network equipment. Similarly, antenna 562, interface 590, and/or processing circuitry 570 may be configured to perform any transmitting operations described herein as being performed by a network node. Any information, data and/or signals may be transmitted to a wireless device, another network node and/or any other network equipment.

Power circuitry 587 may comprise, or be coupled to, power management circuitry and is configured to supply the components of network node 560 with power for performing the functionality described herein. Power circuitry 587 may receive power from power source 586. Power source 586 and/or power circuitry 587 may be configured to provide power to the various components of network node 560 in a form suitable for the respective components (e.g., at a voltage and current level needed for each respective component). Power source 586 may either be included in, or external to, power circuitry 587 and/or network node 560. For example, network node 560 may be connectable to an external power source (e.g., an electricity outlet) via an input circuitry or interface such as an electrical cable, whereby the external power source supplies power to power circuitry 587. As a further example, power source 586 may comprise a source of power in the form of a battery or battery pack which is connected to, or integrated in, power circuitry 587. The battery may provide backup power should the external power source fail. Other types of power sources, such as photovoltaic devices, may also be used.

Alternative embodiments of network node 560 may include additional components beyond those shown in FIG. 6 that may be responsible for providing certain aspects of the network node's functionality, including any of the functionality described herein and/or any functionality necessary to support the subject matter described herein. For example, network node 560 may include user interface equipment to allow input of information into network node 560 and to allow output of information from network node 560. This may allow a user to perform diagnostic, maintenance, repair, and other administrative functions for network node 560.

Figure 7:
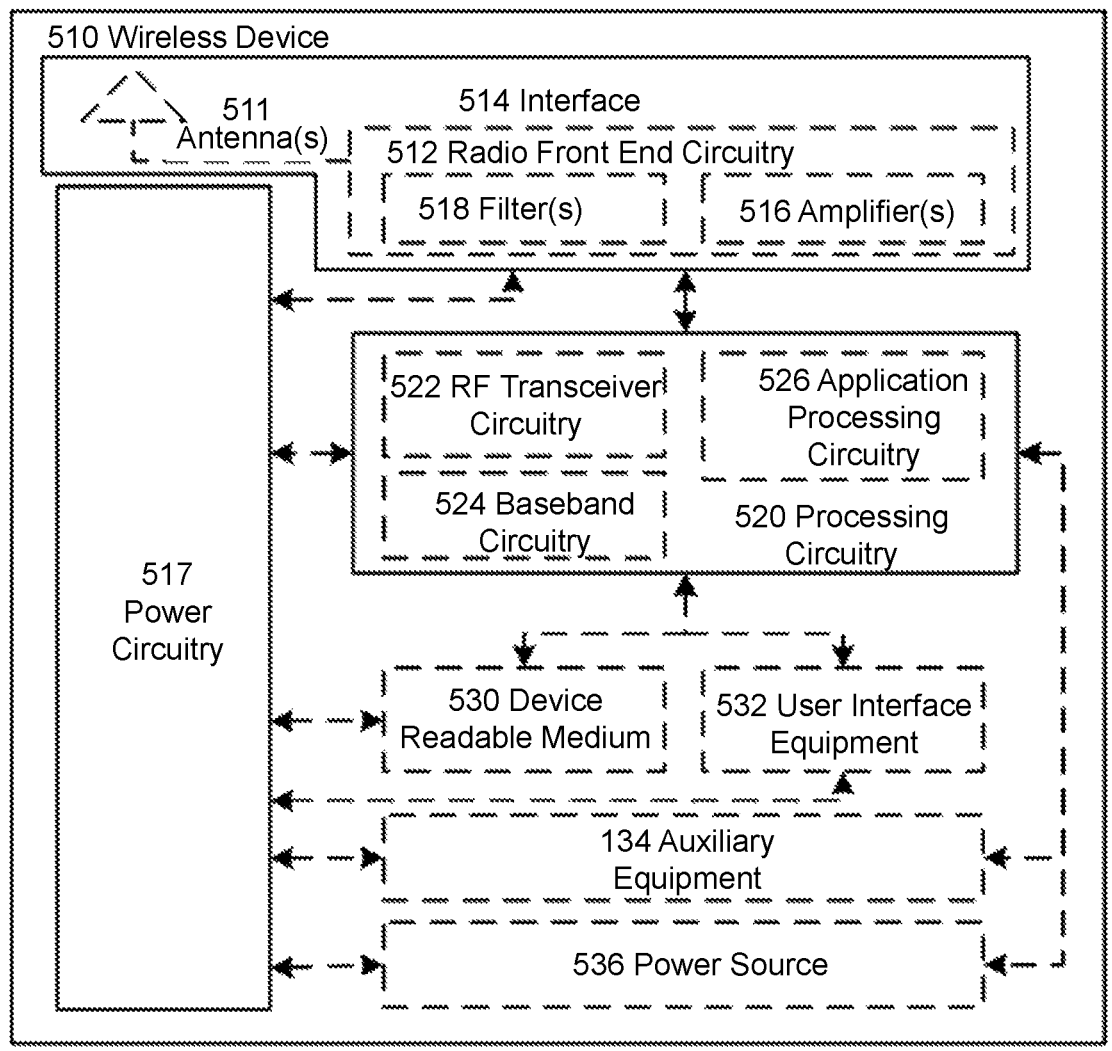
FIG. 7 illustrates an exemplary wireless device, according to certain embodiments.

FIG. 7 illustrates an example wireless device (WD) 510, according to certain embodiments. As used herein, WD refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 510 includes antenna 511, interface 514, processing circuitry 520, device readable medium 530, user interface equipment 532, auxiliary equipment 534, power source 536 and power circuitry 537. WD 510 may include multiple sets of one or more of the illustrated components for different wireless technologies supported by WD 510, such as, for example, GSM, WCDMA, LTE, NR, WiFi, WiMAX, or Bluetooth wireless technologies, just to mention a few. These wireless technologies may be integrated into the same or different chips or set of chips as other components within WD 510.

Antenna 511 may include one or more antennas or antenna arrays, configured to send and/or receive wireless signals, and is connected to interface 514. In certain alternative embodiments, antenna 511 may be separate from WD 510 and be connectable to WD 510 through an interface or port. Antenna 511, interface 514, and/or processing circuitry 520 may be configured to perform any receiving or transmitting operations described herein as being performed by a WD. Any information, data and/or signals may be received from a network node and/or another WD. In some embodiments, radio front end circuitry and/or antenna 511 may be considered an interface.

As illustrated, interface 514 comprises radio front end circuitry 512 and antenna 511. Radio front end circuitry 512 comprise one or more filters 518 and amplifiers 516. Radio front end circuitry 514 is connected to antenna 511 and processing circuitry 520 and is configured to condition signals communicated between antenna 511 and processing circuitry 520. Radio front end circuitry 512 may be coupled to or a part of antenna 511. In some embodiments, WD 510 may not include separate radio front end circuitry 512; rather, processing circuitry 520 may comprise radio front end circuitry and may be connected to antenna 511. Similarly, in some embodiments, some or all of RF transceiver circuitry 522 may be considered a part of interface 514. Radio front end circuitry 512 may receive digital data that is to be sent out to other network nodes or WDs via a wireless connection. Radio front end circuitry 512 may convert the digital data into a radio signal having the appropriate channel and bandwidth parameters using a combination of filters 518 and/or amplifiers 516. The radio signal may then be transmitted via antenna 511. Similarly, when receiving data, antenna 511 may collect radio signals which are then converted into digital data by radio front end circuitry 512. The digital data may be passed to processing circuitry 520. In other embodiments, the interface may comprise different components and/or different combinations of components.

Processing circuitry 520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 510 components, such as device readable medium 530, WD 510 functionality. Such functionality may include providing any of the various wireless features or benefits discussed herein. For example, processing circuitry 520 may execute instructions stored in device readable medium 530 or in memory within processing circuitry 520 to provide the functionality disclosed herein.

As illustrated, processing circuitry 520 includes one or more of RF transceiver circuitry 522, baseband processing circuitry 524, and application processing circuitry 526. In other embodiments, the processing circuitry may comprise different components and/or different combinations of components. In certain embodiments processing circuitry 520 of WD 510 may comprise a SOC. In some embodiments, RF transceiver circuitry 522, baseband processing circuitry 524, and application processing circuitry 526 may be on separate chips or sets of chips. In alternative embodiments, part or all of baseband processing circuitry 524 and application processing circuitry 526 may be combined into one chip or set of chips, and RF transceiver circuitry 522 may be on a separate chip or set of chips. In still alternative embodiments, part or all of RF transceiver circuitry 522 and baseband processing circuitry 524 may be on the same chip or set of chips, and application processing circuitry 526 may be on a separate chip or set of chips. In yet other alternative embodiments, part or all of RF transceiver circuitry 522, baseband processing circuitry 524, and application processing circuitry 526 may be combined in the same chip or set of chips. In some embodiments, RF transceiver circuitry 522 may be a part of interface 514. RF transceiver circuitry 522 may condition RF signals for processing circuitry 520.

In certain embodiments, some or all of the functionality described herein as being performed by a WD may be provided by processing circuitry 520 executing instructions stored on device readable medium 530, which in certain embodiments may be a computer-readable storage medium. In alternative embodiments, some or all of the functionality may be provided by processing circuitry 520 without executing instructions stored on a separate or discrete device readable storage medium, such as in a hard-wired manner. In any of those particular embodiments, whether executing instructions stored on a device readable storage medium or not, processing circuitry 520 can be configured to perform the described functionality. The benefits provided by such functionality are not limited to processing circuitry 520 alone or to other components of WD 510, but are enjoyed by WD 510 as a whole, and/or by end users and the wireless network generally.

Processing circuitry 520 may be configured to perform any determining, calculating, or similar operations (e.g., certain obtaining operations) described herein as being performed by a WD. These operations, as performed by processing circuitry 520, may include processing information obtained by processing circuitry 520 by, for example, converting the obtained information into other information, comparing the obtained information or converted information to information stored by WD 510, and/or performing one or more operations based on the obtained information or converted information, and as a result of said processing making a determination.

Device readable medium 530 may be operable to store a computer program, software, an application including one or more of logic, rules, code, tables, etc. and/or other instructions capable of being executed by processing circuitry 520. Device readable medium 530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 520. In some embodiments, processing circuitry 520 and device readable medium 530 may be considered to be integrated.

User interface equipment 532 may provide components that allow for a human user to interact with WD 510. Such interaction may be of many forms, such as visual, audial, tactile, etc. User interface equipment 532 may be operable to produce output to the user and to allow the user to provide input to WD 510. The type of interaction may vary depending on the type of user interface equipment 532 installed in WD 510. For example, if WD 510 is a smart phone, the interaction may be via a touch screen; if WD 510 is a smart meter, the interaction may be through a screen that provides usage (e.g., the number of gallons used) or a speaker that provides an audible alert (e.g., if smoke is detected). User interface equipment 532 may include input interfaces, devices and circuits, and output interfaces, devices and circuits. User interface equipment 532 is configured to allow input of information into WD 510, and is connected to processing circuitry 520 to allow processing circuitry 520 to process the input information. User interface equipment 532 may include, for example, a microphone, a proximity or other sensor, keys/buttons, a touch display, one or more cameras, a USB port, or other input circuitry. User interface equipment 532 is also configured to allow output of information from WD 510, and to allow processing circuitry 520 to output information from WD 510. User interface equipment 532 may include, for example, a speaker, a display, vibrating circuitry, a USB port, a headphone interface, or other output circuitry. Using one or more input and output interfaces, devices, and circuits, of user interface equipment 532, WD 510 may communicate with end users and/or the wireless network and allow them to benefit from the functionality described herein.

Auxiliary equipment 534 is operable to provide more specific functionality which may not be generally performed by WDs. This may comprise specialized sensors for doing measurements for various purposes, interfaces for additional types of communication such as wired communications etc. The inclusion and type of components of auxiliary equipment 534 may vary depending on the embodiment and/or scenario.

Power source 536 may, in some embodiments, be in the form of a battery or battery pack. Other types of power sources, such as an external power source (e.g., an electricity outlet), photovoltaic devices or power cells, may also be used. WD 510 may further comprise power circuitry 537 for delivering power from power source 536 to the various parts of WD 510 which need power from power source 536 to carry out any functionality described or indicated herein. Power circuitry 537 may in certain embodiments comprise power management circuitry. Power circuitry 537 may additionally or alternatively be operable to receive power from an external power source; in which case WD 510 may be connectable to the external power source (such as an electricity outlet) via input circuitry or an interface such as an electrical power cable. Power circuitry 537 may also in certain embodiments be operable to deliver power from an external power source to power source 536. This may be, for example, for the charging of power source 536. Power circuitry 537 may perform any formatting, converting, or other modification to the power from power source 536 to make the power suitable for the respective components of WD 510 to which power is supplied.

Figure 8:
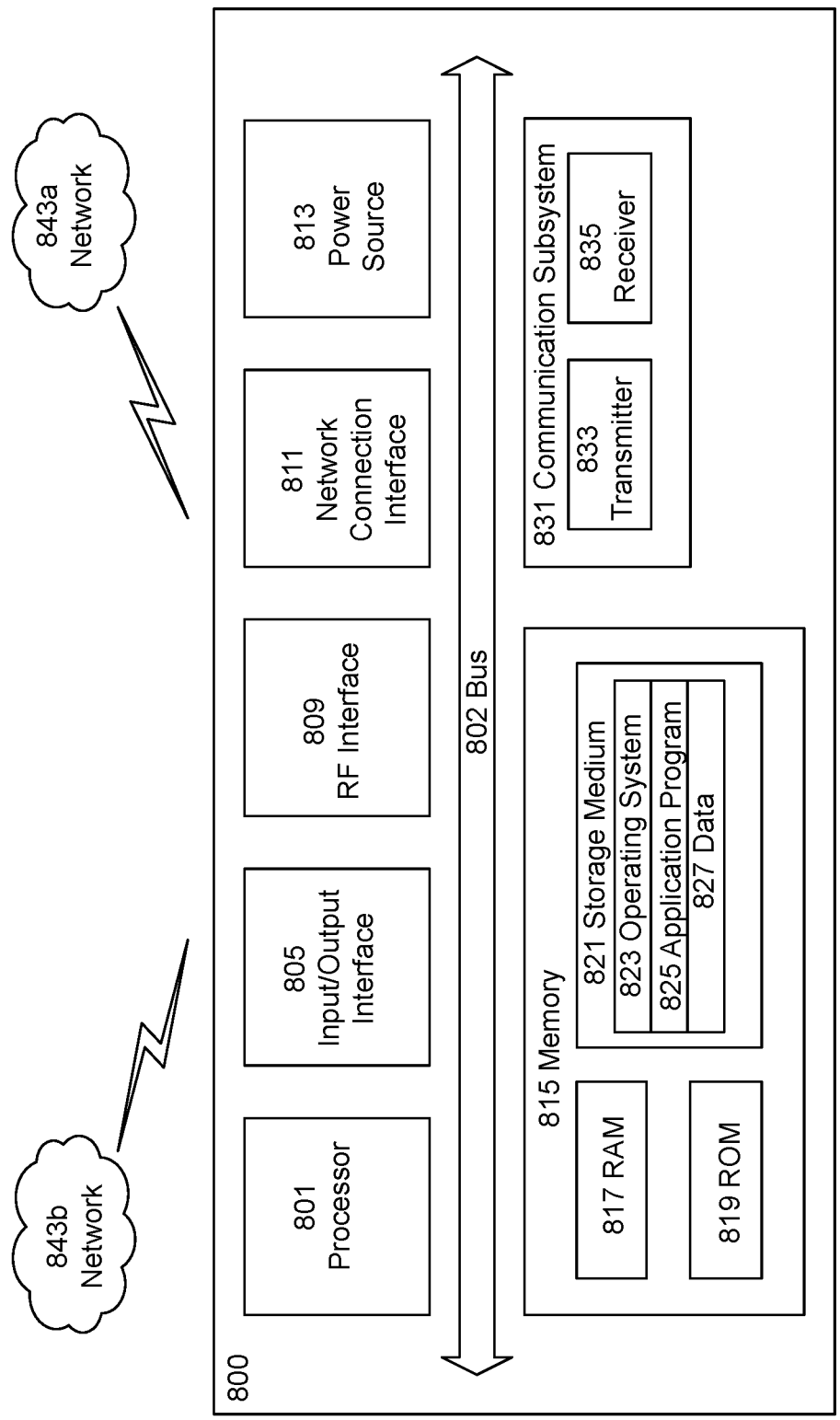
FIG. 8 illustrates an example user equipment (UE), according to certain embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 800 may be any UE identified by the $3^{rd}$ Generation Partnership Project (3GPP), including a NB-IoT UE, a machine type communication (MTC) UE, and/or an enhanced MTC (eMTC) UE. UE 800, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 800 includes processing circuitry 801 that is operatively coupled to input/output interface 805, radio frequency (RF) interface 809, network connection interface 811, memory 815 including random access memory (RAM) 817, read-only memory (ROM) 819, and storage medium 821 or the like, communication subsystem 831, power source 833, and/or any other component, or any combination thereof. Storage medium 821 includes operating system 823, application program 825, and data 827. In other embodiments, storage medium 821 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 801 may be configured to process computer instructions and data. Processing circuitry 801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 801 may include two central processing units (CPUs). Data may be information in a form suitable for use by a computer.

In the depicted embodiment, input/output interface 805 may be configured to provide a communication interface to an input device, output device, or input and output device. UE 800 may be configured to use an output device via input/output interface 805. An output device may use the same type of interface port as an input device. For example, a USB port may be used to provide input to and output from UE 800. The output device may be a speaker, a sound card, a video card, a display, a monitor, a printer, an actuator, an emitter, a smartcard, another output device, or any combination thereof. UE 800 may be configured to use an input device via input/output interface 805 to allow a user to capture information into UE 800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 809 may be configured to provide a communication interface to RF components such as a transmitter, a receiver, and an antenna. Network connection interface 811 may be configured to provide a communication interface to network 843a. Network 843a may encompass wired and/or wireless networks such as a local-area network (LAN), a wide-area network (WAN), a computer network, a wireless network, a telecommunications network, another like network or any combination thereof. For example, network 843a may comprise a Wi-Fi network. Network connection interface 811 may be configured to include a receiver and a transmitter interface used to communicate with one or more other devices over a communication network according to one or more communication protocols, such as Ethernet, TCP/IP, SONET, ATM, or the like. Network connection interface 811 may implement receiver and transmitter functionality appropriate to the communication network links (e.g., optical, electrical, and the like). The transmitter and receiver functions may share circuit components, software or firmware, or alternatively may be implemented separately.

RAM 817 may be configured to interface via bus 802 to processing circuitry 801 to provide storage or caching of data or computer instructions during the execution of software programs such as the operating system, application programs, and device drivers. ROM 819 may be configured to provide computer instructions or data to processing circuitry 801. For example, ROM 819 may be configured to store invariant low-level system code or data for basic system functions such as basic input and output (I/O), startup, or reception of keystrokes from a keyboard that are stored in a non-volatile memory. Storage medium 821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 821 may be configured to include operating system 823, application program 825 such as a web browser application, a widget or gadget engine or another application, and data file 827. Storage medium 821 may store, for use by UE 800, any of a variety of various operating systems or combinations of operating systems.

Storage medium 821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 821 may allow UE

800 to access computer-executable instructions, application programs or the like, stored on transitory or non-transitory memory media, to off-load data, or to upload data. An article of manufacture, such as one utilizing a communication system may be tangibly embodied in storage medium 821, which may comprise a device readable medium.

In FIG. 8, processing circuitry 801 may be configured to communicate with network 843*b* using communication subsystem 831. Network 843*a* and network 843*b* may be the same network or networks or different network or networks. Communication subsystem 831 may be configured to include one or more transceivers used to communicate with network 843*b*. For example, communication subsystem 831 may be configured to include one or more transceivers used to communicate with one or more remote transceivers of another device capable of wireless communication such as another WD, UE, or base station of a radio access network (RAN) according to one or more communication protocols, such as IEEE 802. 2, CDMA, WCDMA, GSM, LTE, UTRAN, WiMax, or the like. Each transceiver may include transmitter 833 and/or receiver 835 to implement transmitter or receiver functionality, respectively, appropriate to the RAN links (e.g., frequency allocations and the like). Further, transmitter 833 and receiver 835 of each transceiver may share circuit components, software or firmware, or alternatively may be implemented separately.

In the illustrated embodiment, the communication functions of communication subsystem 831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 831 may include cellular communication, Wi-Fi communication, Bluetooth communication, and GPS communication. Network 843*b* may encompass wired and/or wireless networks such as a local-area network (LAN), a wide-area network (WAN), a computer network, a wireless network, a telecommunications network, another like network or any combination thereof. For example, network 843*b* may be a cellular network, a Wi-Fi network, and/or a near-field network. Power source 813 may be configured to provide alternating current (AC) or direct current (DC) power to components of UE 800.

The features, benefits and/or functions described herein may be implemented in one of the components of UE 800 or partitioned across multiple components of UE 800. Further, the features, benefits, and/or functions described herein may be implemented in any combination of hardware, software or firmware. In one example, communication subsystem 831 may be configured to include any of the components described herein. Further, processing circuitry 801 may be configured to communicate with any of such components over bus 802. In another example, any of such components may be represented by program instructions stored in memory that when executed by processing circuitry 801 perform the corresponding functions described herein. In another example, the functionality of any of such components may be partitioned between processing circuitry 801 and communication subsystem 831. In another example, the non-computationally intensive functions of any of such components may be implemented in software or firmware and the computationally intensive functions may be implemented in hardware.

Figure 9:
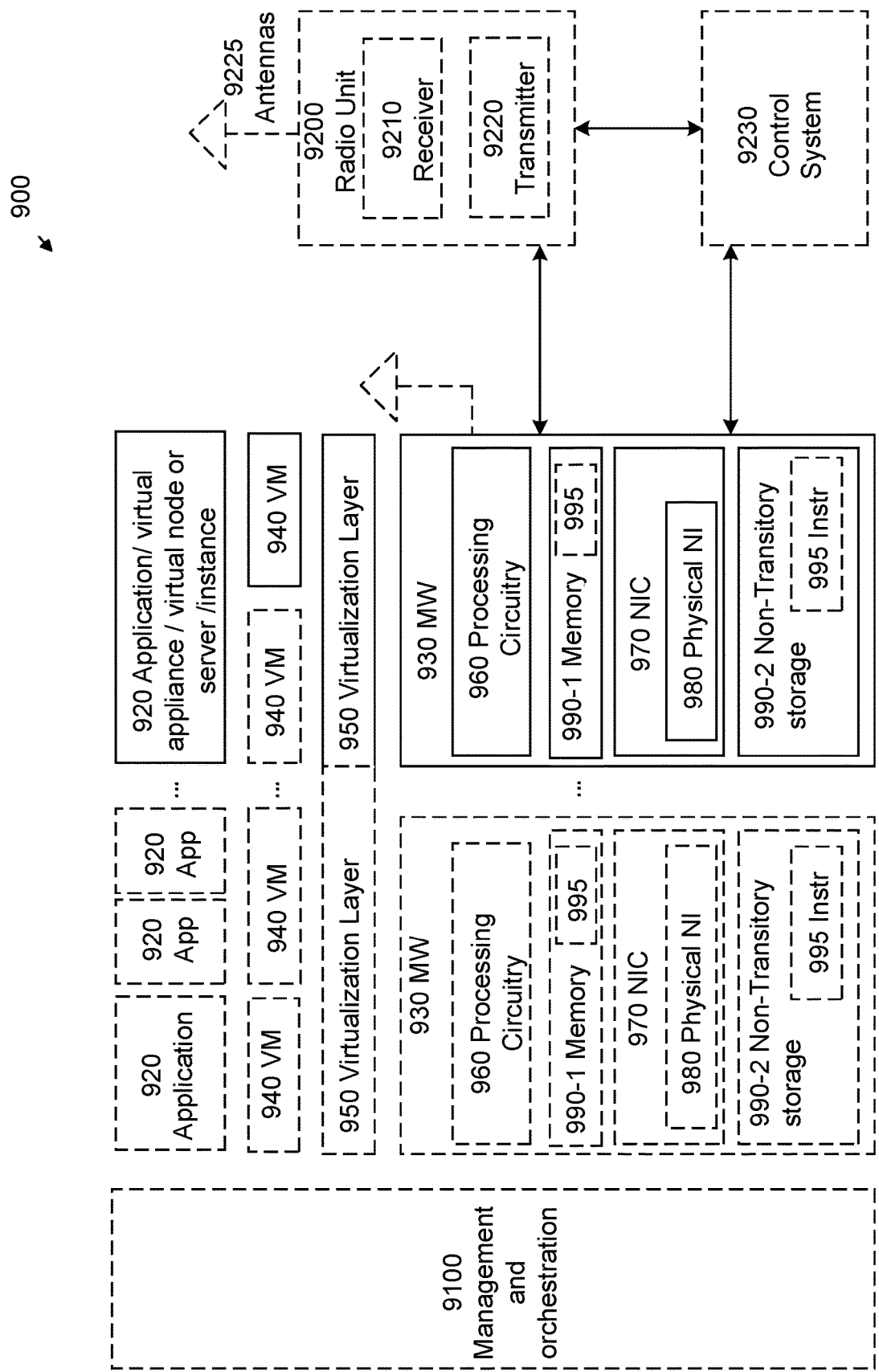
FIG. 9 illustrates an exemplary radio network controller or core network node, according to certain embodiments.

FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. Applications 920 are run in virtualization environment 900 which provides hardware 930 comprising processing circuitry 960 and memory 990. Memory 990 contains instructions 995 executable by processing circuitry 960 whereby application 920 is operative to provide one or more of the features, benefits, and/or functions disclosed herein.

Virtualization environment 900, comprises general-purpose or special-purpose network hardware devices 930 comprising a set of one or more processors or processing circuitry 960, which may be commercial off-the-shelf (COTS) processors, dedicated Application Specific Integrated Circuits (ASICs), or any other type of processing circuitry including digital or analog hardware components or special purpose processors. Each hardware device may comprise memory 990-1 which may be non-persistent memory for temporarily storing instructions 995 or software executed by processing circuitry 960. Each hardware device may comprise one or more network interface controllers (NICs) 970, also known as network interface cards, which include physical network interface 980. Each hardware device may also include non-transitory, persistent, machine-readable storage media 990-2 having stored therein software 995 and/or instructions executable by processing circuitry 960. Software 995 may include any type of software including software for instantiating one or more virtualization layers 950 (also referred to as hypervisors), software to execute virtual machines 940 as well as software allowing it to execute functions, features and/or benefits described in relation with some embodiments described herein.

Virtual machines 940, comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940, and the implementations may be made in different ways.

During operation, processing circuitry 960 executes software 995 to instantiate the hypervisor or virtualization layer 950, which may sometimes be referred to as a virtual machine monitor (VMM). Virtualization layer 950 may present a virtual operating platform that appears like networking hardware to virtual machine 940.

As shown in FIG. 9, hardware 930 may be a standalone network node with generic or specific components. Hardware 930 may comprise antenna 9825 and may implement some functions via virtualization. Alternatively, hardware 930 may be part of a larger cluster of hardware (e.g. such as in a data center or customer premise equipment (CPE)) where many hardware nodes work together and are managed via management and orchestration (MANO) 9100, which, among others, oversees lifecycle management of applications 920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 940 may be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network elements (VNE).

Still in the context of NFV, Virtual Network Function (VNF) is responsible for handling specific network functions that run in one or more virtual machines 940 on top of hardware networking infrastructure 930 and corresponds to application 920 in FIG. 3.

In some embodiments, one or more radio units 9800 that each include one or more transmitters 9220 and one or more receivers 9210 may be coupled to one or more antennas 9825. Radio units 9800 may communicate directly with hardware nodes 930 via one or more appropriate network interfaces and may be used in combination with the virtual components to provide a virtual node with radio capabilities, such as a radio access node or a base station.

In some embodiments, some signaling can be effected with the use of control system 9230 which may alternatively be used for communication between the hardware nodes 930 and radio units 9800.

Figure 10:
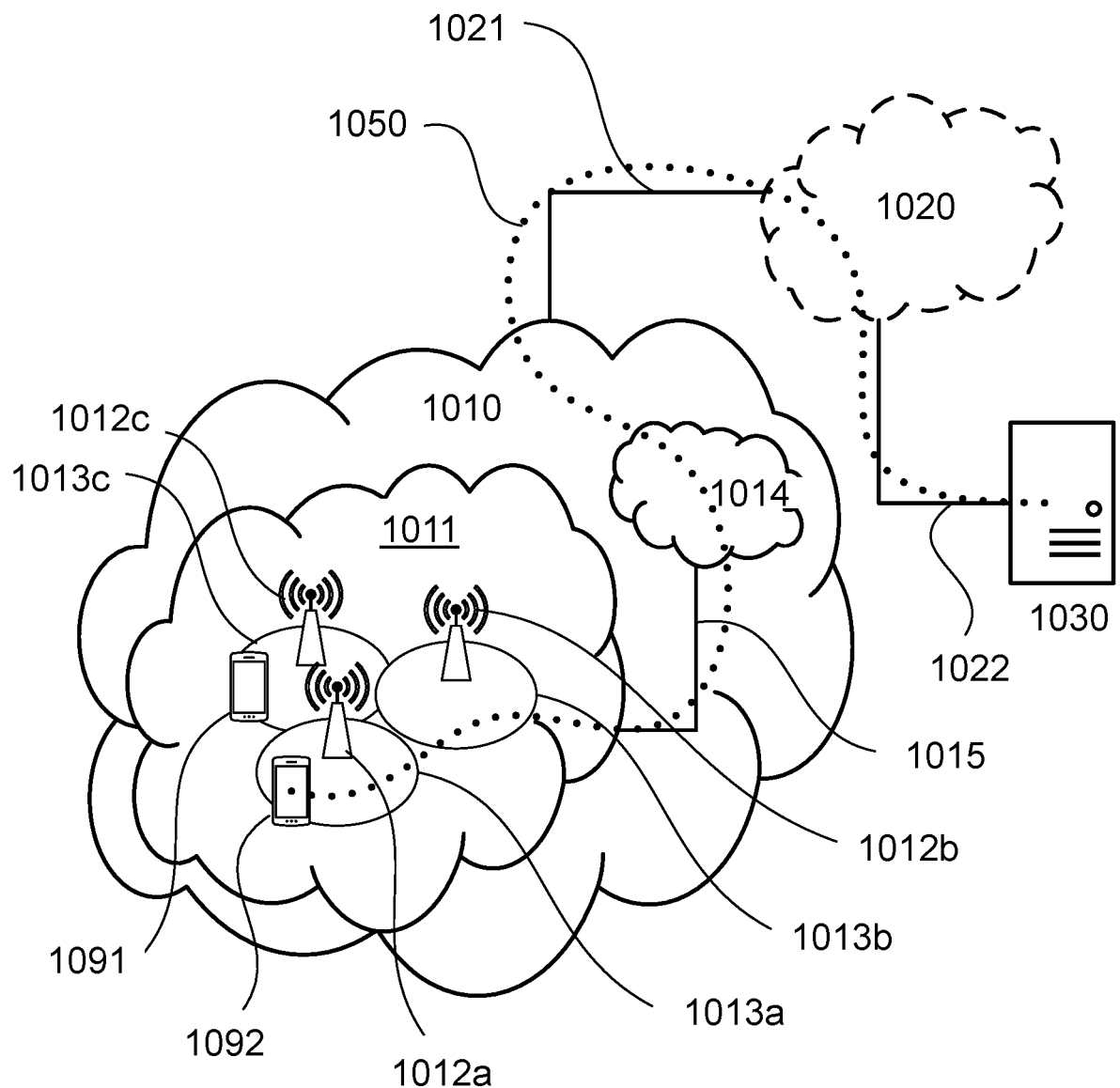
FIG. 10 illustrates a telecommunication network connected via an intermediate network to a host computer, according to certain embodiments.

FIG. 10 illustrates a communication system according to certain embodiments. In accordance with the depicted embodiment, for example, the communication system includes telecommunication network 1010, such as a 3GPP-type cellular network, which comprises access network 1011, such as a radio access network, and core network 1014. Access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A first UE 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 11. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11)

served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

Figure 11:
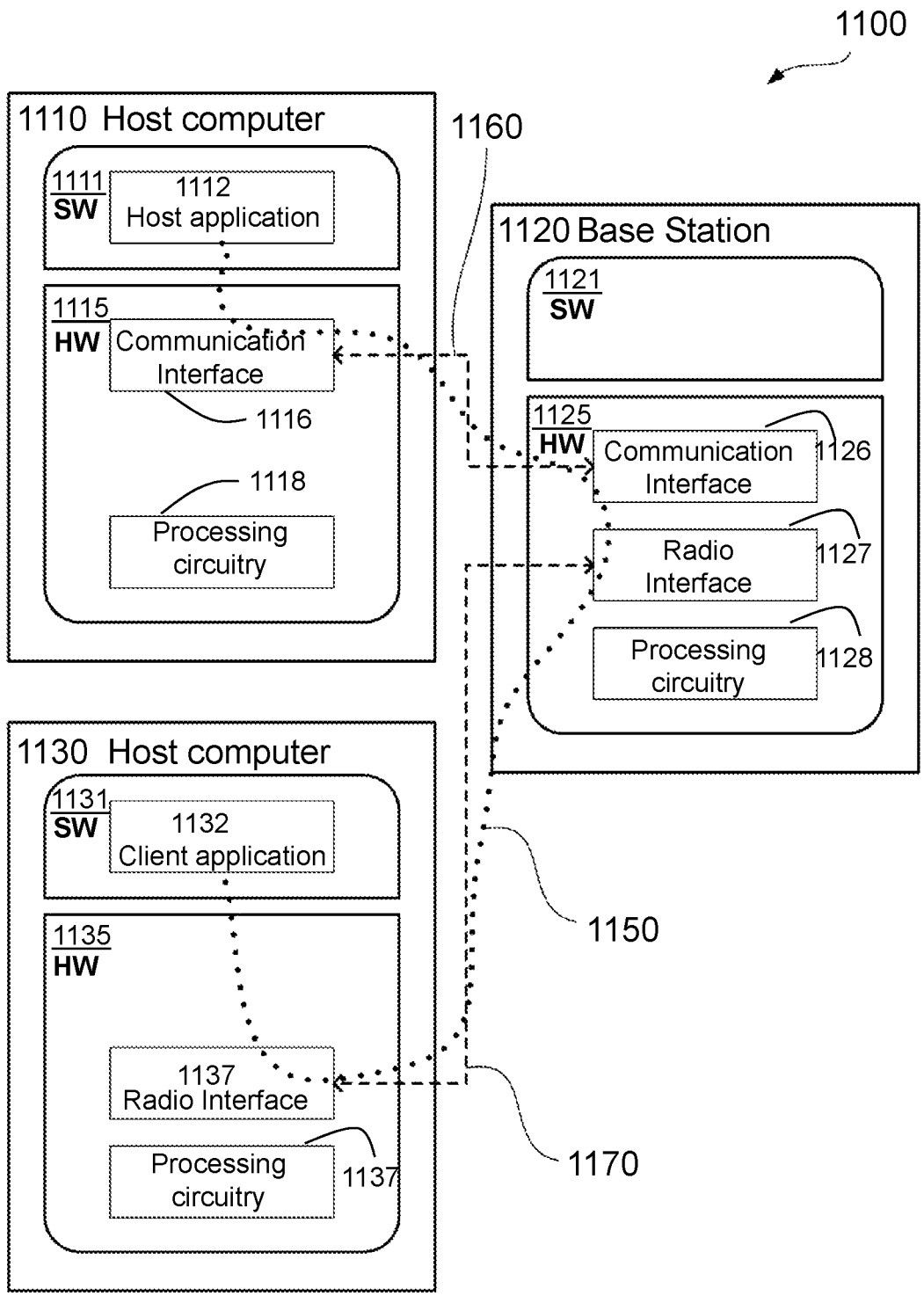
FIG. 11 illustrates a generalized block diagram of a host computer communicating via a base station with a user equipment over a partially wireless connection, according to certain embodiments.

It is noted that host computer 1110, base station 1120 and UE 1130 illustrated in FIG. 11 may be similar or identical to host computer 1030, one of base stations 1012a, 1012b, 1012c and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 550 while it monitors propagation times, errors etc.

Figures 12, 13:
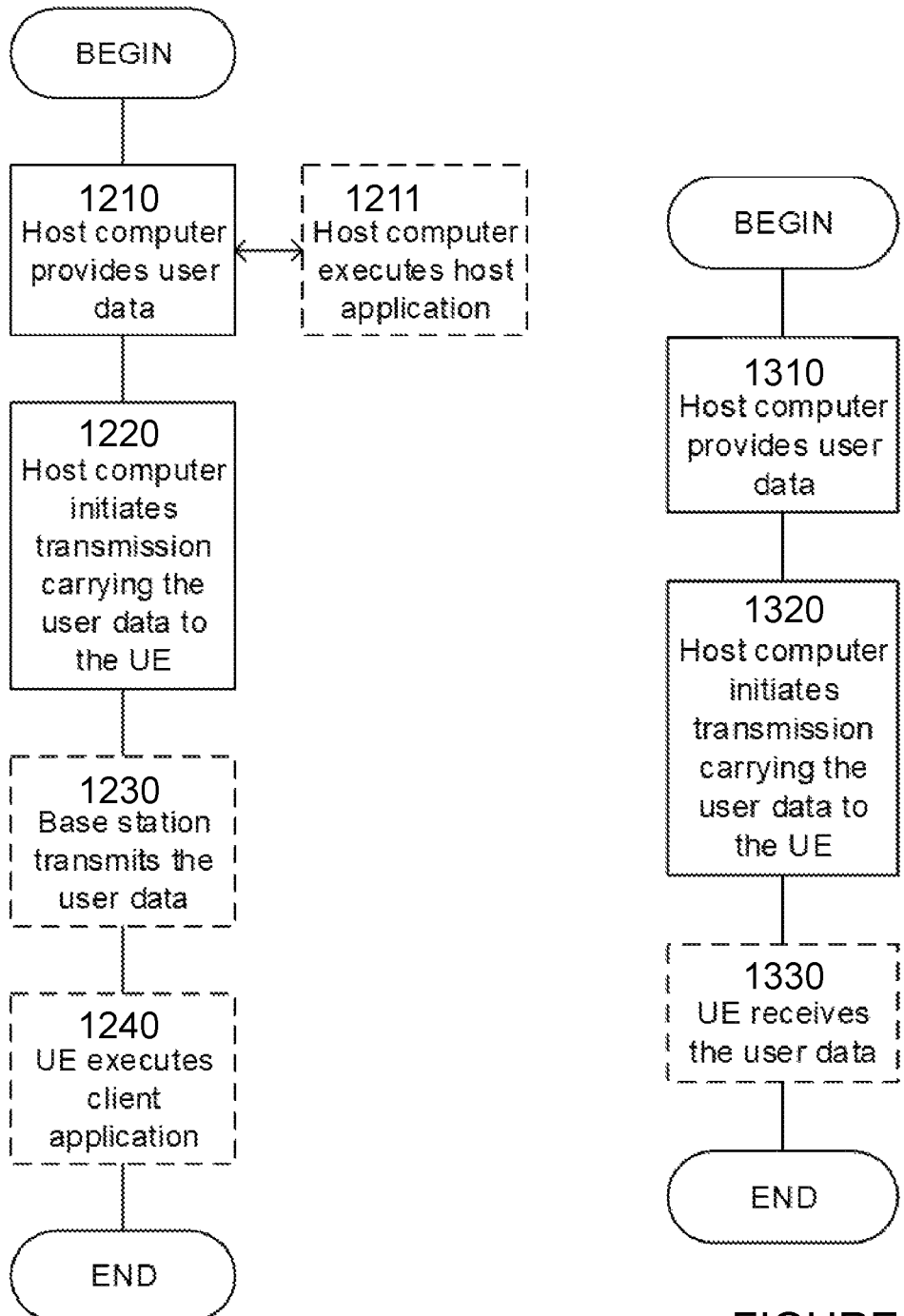
FIG. 12 illustrates a method implemented in a communication system, according to one embodiment.
FIG. 13 illustrates another method implemented in a communication system, according to one embodiment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

Figures 14, 15:
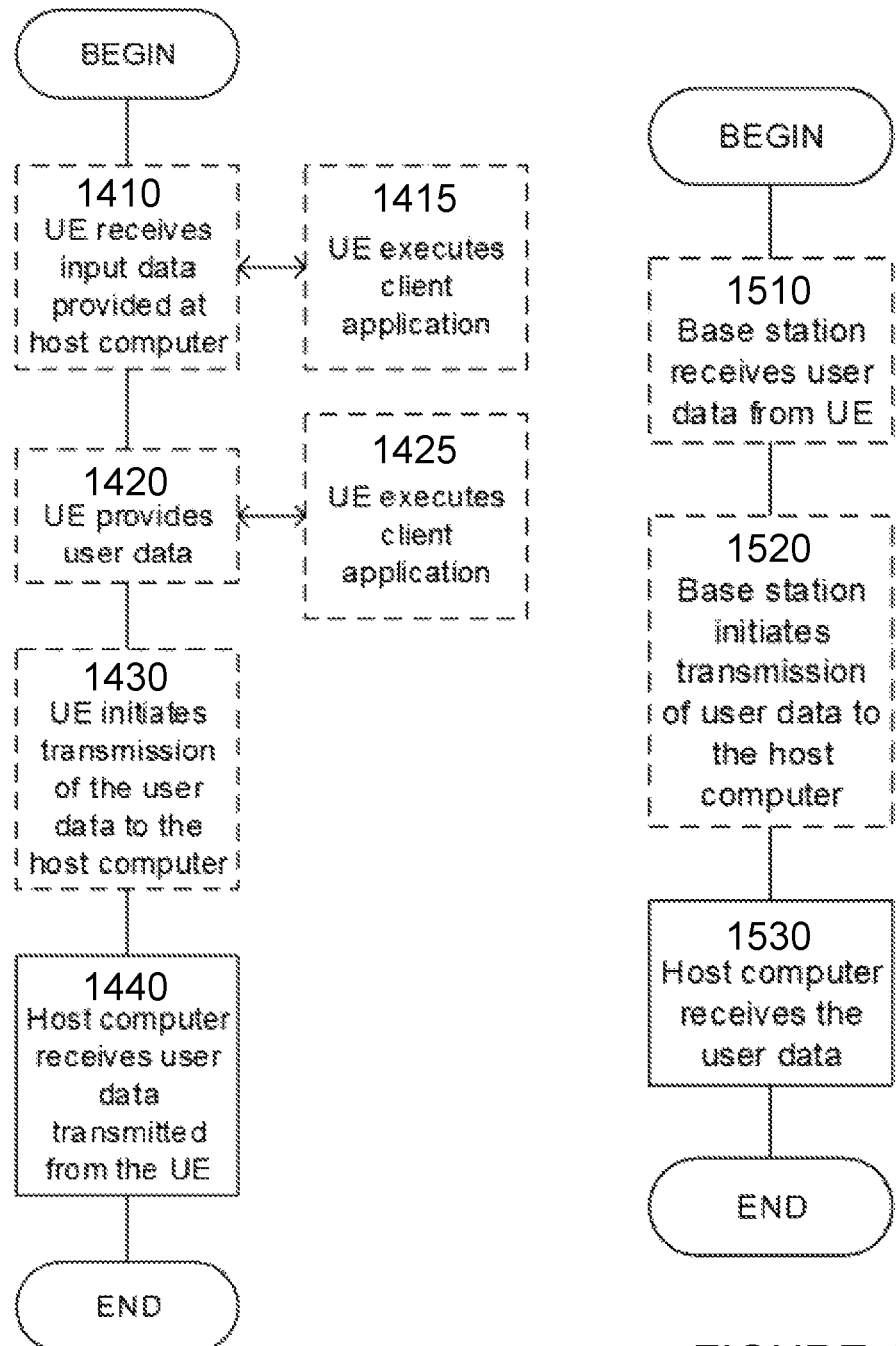
FIG. 14 illustrates another method implemented in a communication system, according to one embodiment.
FIG. 15 illustrates another method implemented in a communication system, according to one embodiment.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 320, the host computer initiates a transmission carrying the user data to the UE. The transmission may pass via the base station, in accordance with the teachings of the embodiments described throughout this disclosure. In step 1330 (which may be optional), the UE FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1425 (which may be optional) of step 1420, the UE provides the user data by executing a client application. In substep 1415 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 16:
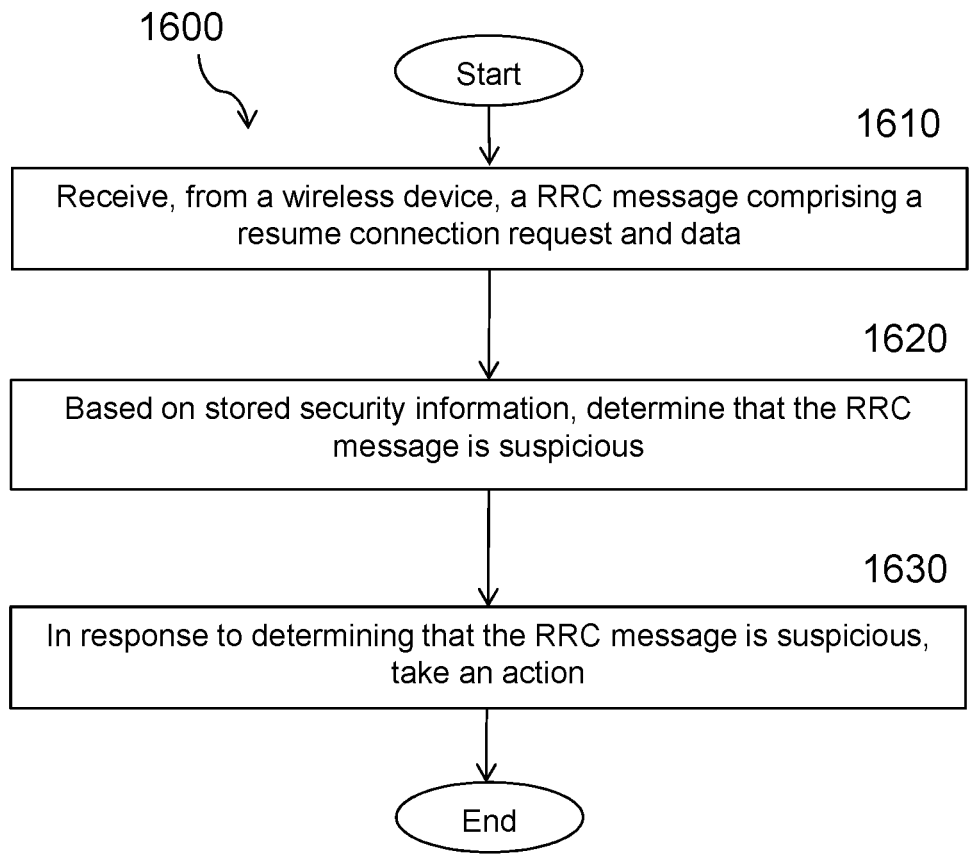
FIG. 16 illustrates an exemplary method by a network node for secure handling of EDT during RA procedure, in accordance with certain embodiments.

FIG. 16 illustrates an exemplary method 1600 by a network node 560 for secure handling of EDT during RA procedure before RRC setup is complete. The method begins at step 1610 when network node 560 receives, from a wireless device 510, a RRC message comprising a resume connection request and data.

Based on stored security information, network node 560 determines that the RRC message is suspicious, at step 1620.

In response to determining that the RRC message is suspicious, network node 560 takes an action, at step 1630.

In a particular embodiment, the action may include rejecting wireless device 510 without a suspend indication. In another embodiment, the action may include releasing wireless device 510 without a suspend indication.

In still another embodiment, the action may include investigating an authenticity of wireless device 510 by storing the data included with the RRC message, transmitting a message to the wireless device to direct the wireless device to enter a connected state, receiving an additional message from the wireless device, and assessing the validity of the RRC message based on stored security information and information in the additional message. In a particular embodiment, the information in the additional message from the wireless device includes a MAC-I, and the validity of the RRC message is assessed based on the MAC-I.

In a particular embodiment, the method may also include determining, by network node 560, that wireless device 510 is legitimate based on the information in the additional message. Network node 560 may forward the data included in the RRC message to an S-gateway.

In a particular embodiment, the RRC message may include a security token, and the stored security information may include at least one additional security token associated with at least one previously received RRC message. The RRC message may be determined to be suspicious when the security token associated with the RRC message is the same as at least one additional security token associated with the at least one previously received RRC message. In a further particular embodiment, the security token may include a sR-MAC-I.

In a particular embodiment, the action may include receiving at least one additional RRC message comprising a resume request, determining that a threshold number of resume connection requests has been exceeded, and performing a release without suspend indication of the wireless device.

In a particular embodiment, the network node may include a target network node associated with a request to resume an RRC connection of the wireless device, which was suspended from a source network node. In this scenario, the action may include sending, by network node 560, a message to the source network node indicating that a context associated with the wireless device should not be deleted.

In another particular embodiment, the network node may include a target network node associated with a handover of the wireless device from a source network node to the target network node. In this scenario, the action may include sending, by network node 560, a context associated with wireless device 510 to the source network node.

Figure 17:
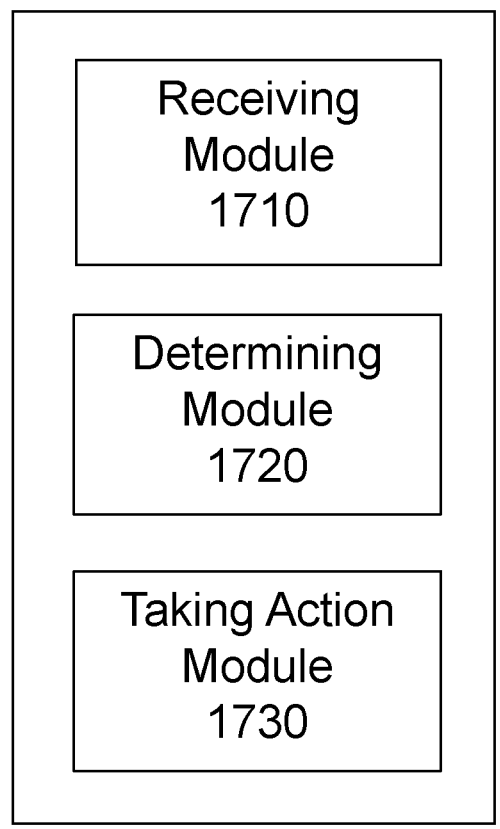
FIG. 17 illustrates an exemplary virtual computing device for secure handling of EDT during RA procedure, in accordance with certain embodiments.

In certain embodiments, the method for secure handling of EDT during RA procedure as described above may be performed by a virtual computing device. FIG. 17 illustrates an exemplary virtual computing device 1700 for secure handling of EDT during RA procedure, in accordance with certain embodiments. In certain embodiments, virtual computing device 1700 may include modules for performing steps similar to those described above with regard to the method illustrated and described in FIG. 16. For example, virtual computing device 1700 may include a receiving module 1710, a determining module 1720, a taking action module 1730, and any other suitable modules for secure handling of EDT during RA procedure. In some embodiments, one or more of the modules may be implemented using processing circuitry 570 of FIG. 6. In certain embodiments, the functions of two or more of the various modules may be combined into a single module.

The receiving module 1710 may perform the receiving functions of virtual computing device 1700. For example, in a particular embodiment, receiving module 1710 may receive, from a wireless device 510, a RRC message comprising a resume connection request and data.

The determining module 1720 may perform the determining functions of virtual computing device 1700. For example, in a particular embodiment, determining module 1720 may determine that the RRC message is suspicious based on stored security information.

The taking action module 1730 may perform the taking action functions of virtual computing device 1700. For example, In a particular embodiment, taking action module 1730 may take an action in response to determining that the RRC message is suspicious.

Other embodiments of virtual computing device 1700 may include additional components beyond those shown in FIG. 17 that may be responsible for providing certain aspects of the network node's functionality, including any of the functionality described above and/or any additional functionality (including any functionality necessary to support the solutions described above). The various different types of network nodes 560 may include components having the same physical hardware but configured (e.g., via programming) to support different radio access technologies, or may represent partly or entirely different physical components.

Figure 18:
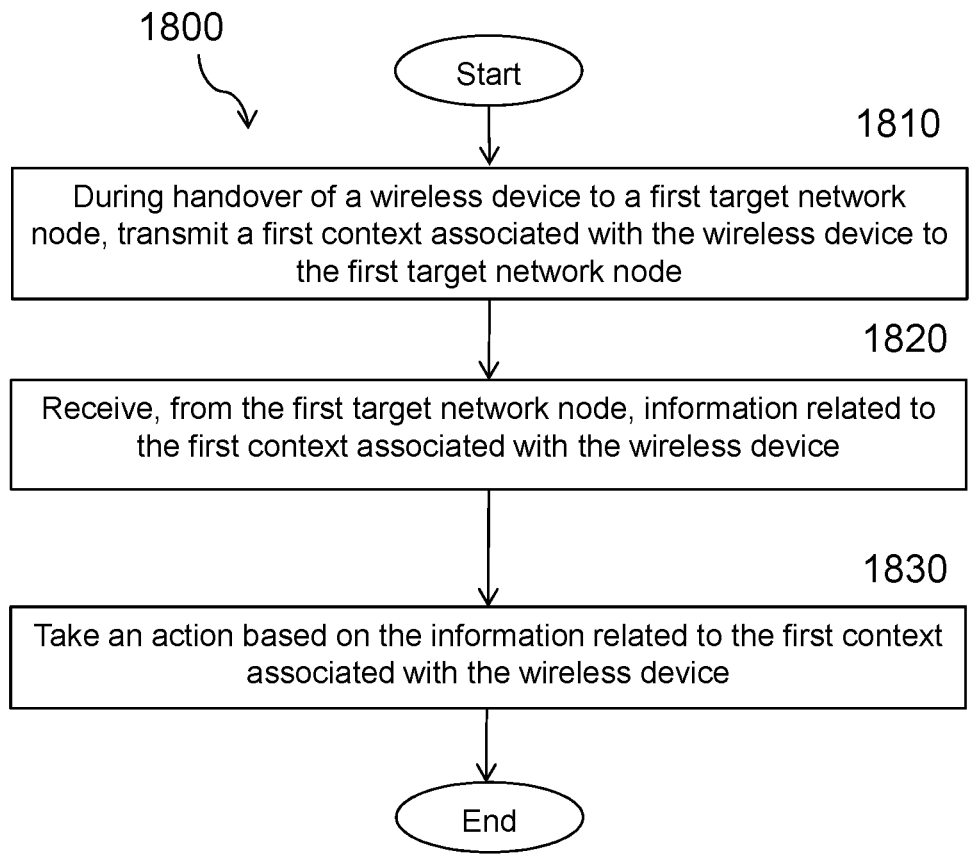
FIG. 18 illustrates an exemplary method by a source network node associated with a first handover of a wireless device from the source network node to a first target network node, in accordance with certain embodiments.

FIG. 18 illustrates an exemplary method by a network node 560 operating as a source network node associated with a first handover of a wireless device 510 from the source network node 560 to a first target network node, in accordance with certain embodiments. The method begins at step 1810 when, during the handover of wireless device 510 to the first target network node, network node 560 transmits a first context associated with wireless device 510 to the first target network node.

At step 1820, network node 560 receives from the first target network node information related to the first context associated with wireless device 510.

At step 1830, network node 560 takes an action based on the information related to the first context associated with wireless device 510.

In a particular embodiment, the information indicates that the first context associated with wireless device 510 should not be deleted, and the action includes maintaining storage of the first context associated with wireless device 510. Additionally, in a further particular embodiment, the method may also include receiving a request to handover wireless device 510 to a second target network node after receiving the information from the first target network node. Network node 560 may then transmit to the second target network node the first context associated with wireless device 510. Alternatively, in another particular embodiment, the information comprises a second context associated with wireless device 510, and the action may include replacing the first context associated with wireless device 510 with the second context associated with wireless device 510. In a further particular embodiment, after receiving the information from the first target network node, network node 560 may receive a request to handover wireless device 510 to a second target network node and transmit, to the second target network node, the second context associated with wireless device 510.

Figure 19:
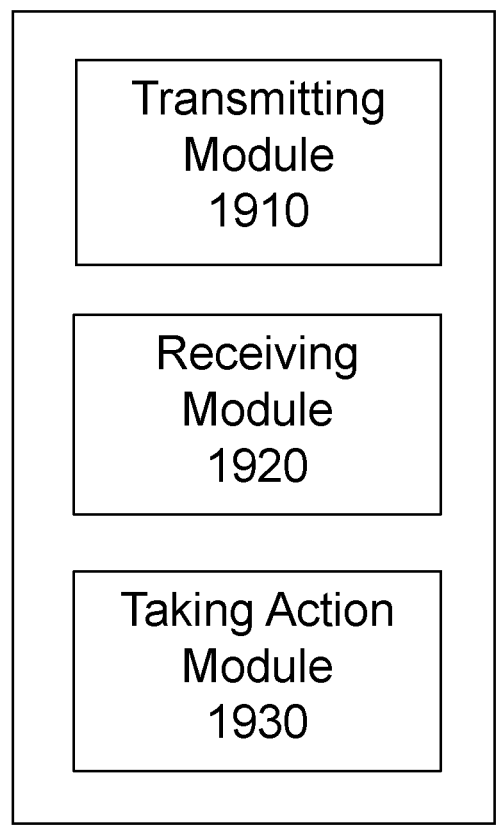
FIG. 19 illustrates an exemplary virtual computing device for secure handling of EDT during a handover of a wireless device from the source network node to a first target network node, in accordance with certain embodiments.

In certain embodiments, the method for secure handling of EDT during a handover of a wireless device from the source network node to a first target network node as described above may be performed by a computer networking virtual apparatus. FIG. 19 illustrates an example virtual computing device 1900 for secure handling of EDT during a handover of a wireless device from the source network node to a first target network node, in accordance with certain embodiments. In certain embodiments, virtual computing device 1900 may include modules for performing steps similar to those described above with regard to the method illustrated and described in FIG. 18. For example, virtual computing device 1900 may include a transmitting module 1910, a receiving module 1920, a taking action module 1930, and any other suitable modules for secure handling of EDT during a handover of a wireless device from the source network node to a first target network node. In some embodiments, one or more of the modules may be implemented using processing circuitry 570 of FIG. 6. In certain embodiments, the functions of two or more of the various modules may be combined into a single module.

The transmitting module 1910 may perform the transmitting functions of virtual computing device 1900. For example, in a particular embodiment, transmitting module 1910 may transmit a first context associated with wireless device 510 to the first target network node during the handover of wireless device 510 to the first target network node.

The receiving module 1920 may perform the receiving functions of virtual computing device 1900. For example, in a particular embodiment, receiving module 1920 may receive from the first target network node information related to the first context associated with wireless device 510.

The taking action module 1930 may perform the taking action functions of virtual computing device 1900. For example, in a particular embodiment, taking action module 1930 may take action based on the information related to the first context associated with wireless device 510.

Other embodiments of virtual computing device 700 may include additional components beyond those shown in FIG. 7 that may be responsible for providing certain aspects of the network node's functionality, including any of the functionality described above and/or any additional functionality (including any functionality necessary to support the solutions described above). The various different types of network nodes 115 may include components having the same physical hardware but configured (e.g., via programming) to support different radio access technologies, or may represent partly or entirely different physical components.

Certain embodiments are now described:

Embodiment 1. A method performed by a base station for secure handling of early data transmission during Random Access procedure before Radio Resource Control setup is complete, the method comprising:

receiving, from a wireless device, a RRC message comprising a resume connection request and data;

based on stored security information, determining that the RRC message is suspicious; and rejecting the wireless device without a suspend indication.

Embodiment 2. The method of embodiment 1, wherein rejecting the wireless device without a suspend indication comprises:

storing the data included with the RRC message;

transmitting a message to the wireless device to direct the wireless device to enter a connected state;

receiving an additional message from the wireless device; and assessing the validity of the RRC message based at least in part on the stored security information and information in the additional message.

Embodiment 3. The method of embodiment 2, further comprising:

determining that the wireless device is legitimate based on accessing the validity of the RRC message based at least in part on the stored security information and the information in the additional message; and Forwarding the data included in the RRC message to a S-gateway.

Embodiment 4. The method of embodiments 1 to 3, wherein:

the RRC message comprises a security token;

the stored security information comprises at least one security token associated with at least one previously received RRC message; and the RRC message is determined to be suspicious when the security token associated with the RRC message is the same as the at least one security token associated with the at least one previously received RRC message.

Embodiment 5. The method of embodiment 4, wherein the security token comprises a short Resume Message Authentication Code-Integrity (sR-MAC-I).

Embodiment 6. The method of embodiments 1 to 5, wherein determining that the RRC message is suspicious based on stored security information comprises determining that a UE context cannot be retrieved for the wireless device.

Embodiment 7. The method of embodiments 1 to 6, further comprising:

receiving at least one additional RRC message comprising a resume request;

determining that a threshold number of resume connection requests has been exceeded; and performing a complete release of the connection associated with the wireless device.

Embodiment 8. The method of embodiments 1 to 7, further comprising:

obtaining user data; and forwarding the user data to a host computer or a wireless device.

Embodiment 9. A computer program comprising instructions which when executed on a computer perform any of the methods of embodiments 1 to 8.

Embodiment 10. A computer program product comprising computer program, the computer program comprising instructions which when executed on a computer perform any of the methods of embodiments 1 to 8.

Embodiment 11. A non-transitory computer readable medium storing instructions which when executed by a computer perform any of the methods of embodiments 1 to 8.

Embodiment 12. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs receiving, from a wireless device, a RRC message comprising a resume connection request and data;

based on stored security information, determining that the RRC message is suspicious; and rejecting the wireless device without a suspend indication.

Embodiment 13. The method of embodiment 12, further comprising:

at the base station, transmitting the user data.

Embodiment 14. The method of embodiment 13, wherein the user data is provided at the host computer by executing a host application, the method further comprising:

at the UE, executing a client application associated with the host application.

Embodiment 15. A method implemented in a communication system including a host computer, a base station and a user equipment (UE), the method comprising:

at the host computer, receiving, from the base station, user data originating from a transmission which the base station has received from the UE, wherein the base station receives, from a wireless device, a RRC message comprising a resume connection request and data;

based on stored security information, determines that the RRC message is suspicious; and rejects the wireless device without a suspend indication.

Embodiment 16. The method of embodiment 15, further comprising:

at the base station, receiving the user data from the UE.

Embodiment 17. The method of embodiment 16, further comprising:

at the base station, initiating a transmission of the received user data to the host computer.

Embodiment 18. A network node for secure handling of early data transmission during Random Access procedure before Radio Resource Control setup is complete, the network node comprising:

memory storing instructions; and processing circuitry configured to execute the instructions to cause the network node to:

receive, from a wireless device, a RRC message comprising a resume connection request and data;

based on stored security information, determine that the RRC message is suspicious; and reject the wireless device without a suspend indication.

Embodiment 19. The network node of embodiment 18, wherein rejecting the wireless device without a suspend indication comprises:

storing the data included with the RRC message;

transmitting a message to the wireless device to direct the wireless device to enter a connected state;

receiving an additional message from the wireless device; and assessing the validity of the RRC message based at least in part on the stored security information and information in the additional message.

Embodiment 20. The network node of embodiment 19, wherein the processing circuitry is further configured to:

determine that the wireless device is legitimate based on accessing the validity of the RRC message based at least in part on the stored security information and the information in the additional message; and forward the data included in the RRC message to a S-gateway.

Embodiment 21. The network node of embodiments 18 to 20, wherein:

the RRC message comprises a security token;

the stored security information comprises at least one security token associated with at least one previously received RRC message; and the RRC message is determined to be suspicious when the security token associated with the RRC message is the same as the at least one security token associated with the at least one previously received RRC message.

Embodiment 22. The network node of embodiment 21, wherein the security token comprises a short Resume Message Authentication Code-Integrity (sR-MAC-I).

Embodiment 23. The network node of embodiments 18 to 22, wherein determining that the RRC message is suspicious based on stored security information comprises determining that a UE context cannot be retrieved for the wireless device.

Embodiment 24. The network node of embodiments 18 to 23, wherein the processing circuitry is further configured to:
receive at least one additional RRC message comprising a resume request;
determine that a threshold number of resume connection requests has been exceeded; and
perform a complete release of the connection associated with the wireless device.

Embodiment 25. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to:
receive, from a wireless device, a RRC message comprising a resume connection request and data;
based on stored security information, determine that the RRC message is suspicious; and
reject the wireless device without a suspend indication.

Embodiment 26. The communication system of embodiment 253, further including the base station.

Embodiment 27. The communication system of embodiment 26, further including the UE, wherein the UE is configured to communicate with the base station.

Embodiment 28. The communication system of embodiment 27, wherein:
the processing circuitry of the host computer is configured to execute a host application, thereby providing the user data; and
the UE comprises processing circuitry configured to execute a client application associated with the host application.

Embodiment 29. A communication system including a host computer comprising a communication interface configured to receive user data originating from a transmission from a user equipment (UE) to a base station, wherein the base station comprises a radio interface and processing circuitry, the base station's processing circuitry configured to
receive, from a wireless device, a RRC message comprising a resume connection request and data;
based on stored security information, determine that the RRC message is suspicious; and
reject the wireless device without a suspend indication.

Embodiment 30. The communication system of embodiment 29, further including the base station.

Embodiment 31. The communication system of embodiment 30, further including the UE, wherein the UE is configured to communicate with the base station.

Embodiment 32. The communication system of embodiment 31, wherein:
the processing circuitry of the host computer is configured to execute a host application;
the UE is configured to execute a client application associated with the host application, thereby providing the user data to be received by the host computer.

At least some of the following abbreviations may be used in this disclosure. If there is an inconsistency between abbreviations, preference should be given to how it is used above. If listed multiple times below, the first listing should be preferred over any subsequent listing(s):
3GPP 3rd Generation Partnership Project
BI Backoff Indicator
BSR Buffer Status Report
Cat-M1 Category M1
Cat-M2 Category M2
CE Coverage Enhanced/Enhancement
DL Downlink
eMTC enhanced Machine-Type Communications
eNB Evolved NodeB
IoT Internet of Things
LTE Long-Term Evolution
MAC Medium Access Control
MAC-I Message Authentication Code-Integrity
NAS Non-Access Stratum
NB-IoT Narrowband Internet of Things
M2M Machine-to-Machine
MTC Machine-Type Communications
PDCP Packet Data Convergence Protocol
PDU Protocol Data Unit
(N)PRACH (Narrowband) Physical Random Access Channel
PRB Physical Resource Block
RA Random Access
RAPID Random Access Preamble IDentifier
RAR Random Access Response
RLC Radio Link Control
RMAC-I Resume MAC-I
RNTI Radio Network Temporary Identifier
RRC Radio Resource Control (protocol)
SDU Service Data Unit
sRMAC-I short Resume MAC-I
TBS Transport Block Size
UE User Equipment
UL Uplink
WI Work Item

The invention claimed is:

1. A method performed by a network node for secure handling of early data transmission during Random Access procedure before Radio Resource Control, RRC, setup is complete, the method comprising:
receiving, from a wireless device, a RRC message comprising a resume connection request and data;
based on stored security information, determining that the RRC message is suspicious; and
in response to determining that the RRC message is suspicious, taking an action wherein taking the action comprises:
storing the data included with the RRC message;
transmitting a message to the wireless device to direct the wireless device to enter a connected state;
receiving an additional message from the wireless device; and
assessing the validity of the RRC message based on stored security information and information in the additional message.

2. The method of claim 1, wherein taking the action comprises rejecting the wireless device without a suspend indication.

3. The method of claim 1, wherein taking the action comprises releasing the wireless device without a suspend indication.

4. The method of claim 1, wherein the information in the additional message from the wireless device comprises a Message Authentication Code for Integrity, MAC-I, and wherein the validity of the RRC message is assessed based on the MAC-I.

5. The method of claim 1, further comprising:
determining that the wireless device is legitimate based on the information in the additional message; and forwarding the data included in the RRC message to an S-gateway.

6. The method of claim 1, wherein:
the RRC message comprises a security token;
the stored security information comprises at least one additional security token associated with at least one previously received RRC message; and
the RRC message is determined to be suspicious when the security token associated with the RRC message is the same as at least one additional security token associated with the at least one previously received RRC message.

7. The method of claim 1, wherein taking the action comprises:
receiving at least one additional RRC message comprising a resume request;
determining that a threshold number of resume connection requests has been exceeded; and
performing a release without suspend indication of the wireless device.

8. The method of claim 1, wherein the network node comprises a target network node associated with a request to resume an RRC connection of the wireless device f which was suspended from a source network node, and wherein taking the action comprises:
sending a message to the source network node indicating that a context associated with the wireless device should not be deleted.

9. The method of claim 1, wherein the network node comprises a target network node associated with a handover of the wireless device from a source network node to the target network node, and wherein taking the action comprises:
sending a context associated with the wireless device to the source network node.

10. A network node for secure handling of early data transmission during Random Access procedure before Radio Resource Control setup is complete, the network node comprising:
memory storing instructions; and
processing circuitry configured to execute the instructions to cause the network node to:
receive, from a wireless device, a RRC message comprising a resume connection request and data;
based on stored security information, determine that the RRC message is suspicious; and
in response to determining that the RRC message is suspicious, take an action wherein when taking the action the processing circuitry is configured to execute the instructions to cause the network node to:
store the data included with the RRC message;
transmit a message to the wireless device to direct the wireless device to enter a connected state;
receive an additional message from the wireless device; and
assess the validity of the RRC message based on information in the additional message.

11. The network node of claim 10, wherein when taking the action the processing circuitry is configured to execute the instructions to cause the network node to reject the wireless device without a suspend indication.

12. The network node of claim 10, wherein when taking the action the processing circuitry is configured to execute the instructions to cause the network node to release the wireless device without a suspend indication.

13. The network node of claim 10, wherein the information in the additional message from the wireless device comprises a Message Authentication Code-Integrity, MAC-I, and wherein the validity of the RRC message is assessed based on the MAC-I.

14. The network node of claim 10, wherein the processing circuitry is further configured to execute the instructions to cause the network node to:
determine that the wireless device is legitimate based on accessing the validity of the RRC message based at least in part on the information in the additional message; and
forward the data included in the RRC message to an S-gateway.

15. The network node of claim 10, wherein:
the RRC message comprises a security token;
the stored security information comprises at least one additional security token associated with at least one previously received RRC message; and
the RRC message is determined to be suspicious when the security token associated with the RRC message is the same as the at least one additional security token associated with the at least one previously received RRC message.

16. The network node of claim 10, wherein when taking the action the processing circuitry is configured to execute the instructions to cause the network node to:
determine that a threshold number of resume connection requests has been exceeded; and
perform a release without suspend indication of the wireless device.

17. The network node of claim 10, wherein the network node comprises a target network node associated with a request to resume an RRC connection of the wireless device f which was suspended from a source network node, and wherein when taking the action the processing circuitry is configured to execute the instructions to cause the network node to:
send a message to the source network node indicating that a context associated with the wireless device should not be deleted.

18. The network node of claim 10, wherein the network node comprises a target network node associated with a handover of the wireless device from a source network node to the target network node, and wherein when taking the action the processing circuitry is configured to execute the instructions to cause the network node to:
send a context associated with the wireless device to the source network node.

* * * * *